US011940755B2

(12) United States Patent
Hu et al.

(10) Patent No.: US 11,940,755 B2
(45) Date of Patent: Mar. 26, 2024

(54) PROCESS CARTRIDGE WITH MOVABLE FORCE RECEIVING PORTION CONFIGURED TO SEPARATE DEVELOPING ROLLER AND PHOTOSENSITIVE DRUM

(71) Applicant: JIANGXI YIBO E-TECH CO. LTD., Xinyu (CN)

(72) Inventors: Liangliang Hu, Xinyu (CN); Shiping Ao, Xinyu (CN); Fei Hu, Xinyu (CN); Mei Yan, Xinyu (CN); Junliang Qiu, Xinyu (CN); Shaohua Chen, Xinyu (CN); Shuangchun Yuan, Xinyu (CN)

(73) Assignee: JIANGXI YIBO E-TECH CO. LTD., Xinyu (CN)

( * ) Notice: Subject to any disclaimer, the term of this patent is extended or adjusted under 35 U.S.C. 154(b) by 0 days.

(21) Appl. No.: 17/370,599

(22) Filed: Jul. 8, 2021

(65) Prior Publication Data

US 2021/0333749 A1 Oct. 28, 2021

Related U.S. Application Data

(63) Continuation of application No. PCT/CN2019/128395, filed on Dec. 25, 2019.

(30) Foreign Application Priority Data

Jan. 14, 2019 (CN) ......................... 201920056905.9
Jan. 15, 2019 (CN) ......................... 201920064623.3
(Continued)

(51) Int. Cl.
*G03G 21/18* (2006.01)
*G03G 21/16* (2006.01)

(52) U.S. Cl.
CPC ..... *G03G 21/1803* (2013.01); *G03G 21/1619* (2013.01); *G03G 21/1647* (2013.01);
(Continued)

(58) Field of Classification Search
CPC ........... G03G 21/1619; G03G 21/1647; G03G 21/1671; G03G 21/1676; G03G 21/18;
(Continued)

(56) References Cited

U.S. PATENT DOCUMENTS 7,509,071 B2 * 3/2009 Yoshimura ......... G03G 21/1623
399/113
2010/0158563 A1 6/2010 Tanabe et al.
(Continued)

FOREIGN PATENT DOCUMENTS

CN 101542398 A 9/2009
CN 101715570 A 5/2010
(Continued)

*Primary Examiner* — Joseph S Wong
(74) *Attorney, Agent, or Firm* — IPro, PLLC

(57) ABSTRACT

Disclosed is a process cartridge detachably mounted to an image forming device having a tray and force applying components. The process cartridge has a process cartridge frame, a photosensitive unit, a developing unit rotatable relative to the photosensitive unit. The process cartridge frame has a driving side and a conductive side disposed oppositely along a length direction. The driving side has a first driving force receiving portion for rotating a photosensitive drum and a second driving force receiving portion for rotating a developing roller. The developing unit has a force receiving portion for receiving force of force applying components to rotate the developing unit relative to the photosensitive unit. When the process cartridge is pushed into to the image forming device, the force receiving portion move at least in a left-and-right direction and/or an up-and-down direction relative to the frame of the process cartridge.

17 Claims, 36 Drawing Sheets

(30) Foreign Application Priority Data

| | | |
|---|---|---|
| Feb. 20, 2019 | (CN) | 201920211741.2 |
| Mar. 11, 2019 | (CN) | 201920303646.5 |
| Mar. 15, 2019 | (CN) | 201910199883.6 |
| Mar. 20, 2019 | (CN) | 201920357333.8 |

(52) U.S. Cl.
CPC ......... *G03G 21/1671* (2013.01); *G03G 21/18* (2013.01); *G03G 21/1814* (2013.01); *G03G 21/1817* (2013.01); *G03G 21/1821* (2013.01); *G03G 21/1825* (2013.01); *G03G 21/1839* (2013.01); *G03G 21/1842* (2013.01); *G03G 21/186* (2013.01); *G03G 2221/1861* (2013.01)

(58) Field of Classification Search
CPC ........... G03G 21/1803; G03G 21/1814; G03G 21/1817; G03G 21/1821; G03G 21/1825; G03G 21/1839; G03G 21/1842; G03G 21/186
See application file for complete search history.

(56) References Cited

U.S. PATENT DOCUMENTS

| | | | | |
|---|---|---|---|---|
| 2015/0227110 | A1* | 8/2015 | Yoshimura | G03G 21/1825 399/111 |
| 2017/0060081 | A1* | 3/2017 | Kikuchi | G03G 21/1666 |
| 2018/0210393 | A1* | 7/2018 | Makiguchi | G03G 21/185 |

FOREIGN PATENT DOCUMENTS

| | | | |
|---|---|---|---|
| CN | 101963779 | A | 2/2011 |
| CN | 208172501 | U | 11/2018 |
| JP | 2010224117 | A | 10/2010 |

* cited by examiner

PROCESS CARTRIDGE WITH MOVABLE FORCE RECEIVING PORTION CONFIGURED TO SEPARATE DEVELOPING ROLLER AND PHOTOSENSITIVE DRUM

TECHNICAL FIELD

The present invention relates to a process cartridge, and in particular to a force receiving assembly of a process cartridge detachably mounted in an image forming device.

BACKGROUND

An image forming device forms an image on a recording material by using electrophotographic imaging processing. Examples of the image forming device include an electrophotographic copying machine, an electrophotographic printer (for example, a laser beam printer and an LED printer), a facsimile machine, a word processor and so on. A process cartridge includes at least one of an electrophotographic photosensitive drum as an image bearing member and a processing device (a developer bearing member (a developing roller)) capable of acting on the drum, and the electrophotographic photosensitive drum and the processing device are integrally configured to be detachably mounted to a cartridge in the image forming device. The cartridge may include a drum and a developing roller that are integrated, or may include a drum, or may include a developing roller. The cartridge including the drum is a drum cartridge, and the cartridge including the developing roller is a developing cartridge.

As shown in FIGS. 1 to 3, a process cartridge 50*k* including a force receiving assembly of a photosensitive unit 31 and a developing unit 41 is disclosed in the prior art. The process cartridge can be mounted in a tray in the image forming device and mounted into the image forming device along a D1 direction with the tray. The image forming device has a first force applying component 61*k* and a second force applying component 60*k*, wherein the first force applying component 61*k* is rotatable in linkage with an openable door cover 12 in the image forming device, and the second force applying component 60*k* is movable in a mounting direction (D1 direction) of the process cartridge. A first force receiving portion 75 for receiving force of the first force applying component 61*k* and a second force receiving portion 70 for receiving force of the second force applying component 60*k* are provided on the process cartridge. When the process cartridge is mounted into the image forming device, it is linked with the first force applying component 61*k* to make a rotational movement and push the first force receiving portion 75 to move through the closing action of the door cover 12, and the movement of the first force receiving portion 75 drives the second force receiving portion 70 to warp upward or lift from a housing of the process cartridge to cooperate with the second force applying component 60*k*. When the second force receiving portion 70 receives the force of the second force applying component 60*k*, the developing unit 41 may be forced to rotate relative to the photosensitive unit 31, so that a developing roller 42 provided in the developing unit 41 and a photosensitive drum 30 provided in the photosensitive unit 31 are separated. The present invention further develops the above prior art.

SUMMARY

An objective of the present invention is to solve the technical problem that the separation member in the image forming device in the above prior art is prone to jam when the developing cartridge is pushed to rotate.

In order to solve the above technical problem, the present invention is implemented through the following technical solutions:

A process cartridge, which is detachably mounted in an image forming device, wherein the image forming device has force applying components and a movable tray, the tray can move in a front-and-rear direction, a direction in which the tray is pushed into the image forming device is front, and a direction in which the tray is pulled out from the image forming device is rear; and the process cartridge can be mounted into the tray from top to bottom along a direction of gravity, the process cartridge comprising:

- a process cartridge frame;
- a photosensitive unit, in which a rotatable photosensitive drum is included;
- a developing unit, which is rotatable relative to the photosensitive unit, and in which a rotatable developing roller is included,
- wherein the process cartridge frame has a driving side and a conductive side disposed oppositely along a left-and-right direction, and the driving side is provided with a first driving force receiving portion for driving the photosensitive drum to rotate and a second driving force receiving portion for driving the developing roller to rotate; and
- a force receiving portion for receiving force of the force applying components so that the developing unit rotates relative to the photosensitive unit,
- wherein the force receiving portion has a separating force receiving portion for receiving the force of the force applying components so that the developing unit rotates relative to the photosensitive unit; and
- during a process of the process cartridge being pushed into the image forming device with the tray, the force receiving portion can receive the force of the force applying components and move at least in the left-and-right direction and/or an up-and-down direction.

Further, the force receiving portion has a mounting guide portion and a disassembly guide portion, and both the mounting guide portion and the disassembly guide portion can cooperate with the force applying components so that the force receiving portion moves at least in a longitudinal direction and/or gravity direction of the process cartridge frame.

Further, the mounting guide portion is configured as a mounting guide inclined surface, the disassembly guide portion is configured as a disassembly guide inclined surface, and the mounting guide inclined surface and the disassembly guide inclined surface have different extending directions.

Further, the mounting guide portion and the disassembly guide portion are in contact with the force applying components and are urged by the force applying components, and the force receiving portion moves in a direction close to a left side of the process cartridge and/or a lower side of the process cartridge.

Further, the force receiving portion is mounted on the process cartridge frame and is movable relative to the process cartridge frame.

Further, the force receiving portion is fixed onto the process cartridge frame.

Further, the force receiving portion is provided with a side abutting portion, and when the force receiving portion moves from left to right in the image forming device, the side abutting portion is configured to cooperate with the force applying components to temporarily restrict the force receiving portion from moving to a right side.

Further, a separating force receiving portion that receives a separating force of the force applying components to separate the photosensitive drum and the developing roller is provided on the force receiving portion, and the separating force receiving portion is provided adjacent to the side abutting portion and is provided on a left side of the side abutting portion.

Further, a separating force receiving portion that receives a separating force of the force applying components to separate the photosensitive drum and the developing roller is provided on the force receiving portion, and the separating force receiving portion is provided on an upper side of at least a part of the mounting guide portion.

Further, the separating force receiving portion is provided on a front side of the disassembly guide portion.

Further, an elastic member is provided between the force receiving portion and the process cartridge frame.

Further, a magnetic member is provided between the force receiving portion and the process cartridge frame.

Further, a sliding guide rail extending in the left-and-right direction is provided on the process cartridge frame, and the force receiving portion is provided with a sliding guide groove that cooperates with the sliding guide rail.

After the above technical solution is adopted, in the process cartridge provided by the present invention, the cooperation between the force receiving portion and the force applying component in the image forming device during the process of mounting the process cartridge enables the force receiving portion to be moved to avoid the problem of interference between the force receiving portion and the force applying component during the process of mounting the process cartridge. The movement of the force receiving portion is stable. When the developing unit of the process cartridge is forced to rotate relative to the photosensitive drum, the force receiving portion can stably cooperate with the force applying component of the image forming device to receive the force of separating the drum and the roller.

DETAILED DESCRIPTION

The embodiments of the present invention will be described in detail below in conjunction with the drawings. It should be understood that specific embodiments described herein are only used to explain the present invention and are not intended to limit the present invention.

Embodiment 1

Figure 1:
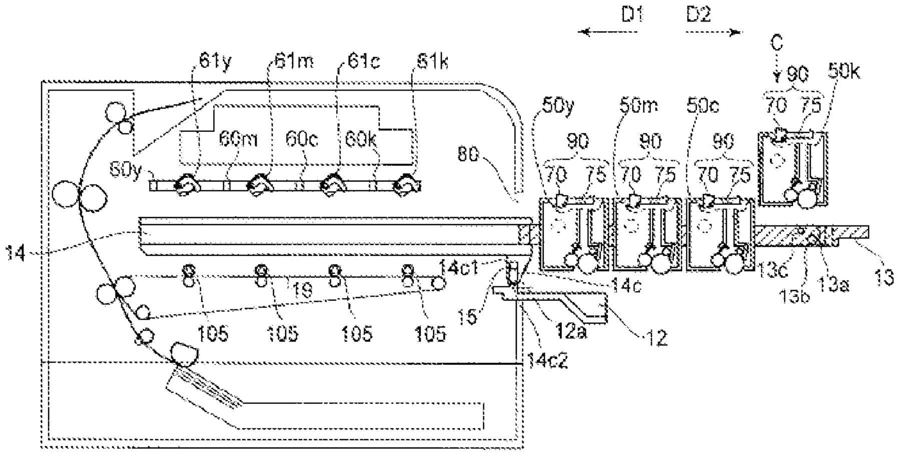
FIG. 1 is a schematic view of a process cartridge in the prior art mounted into an image forming device.
Figure 2:
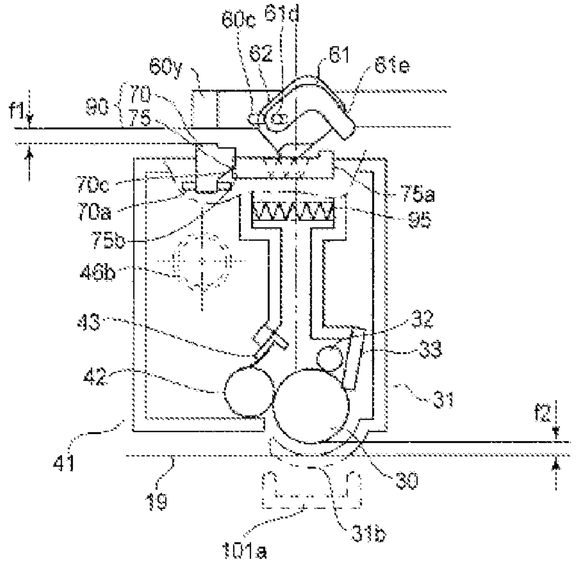
FIGS. 2 and 3 are schematic views of cooperation between the process cartridge in the prior art and a force applying mechanism in image formation.
Figure 3:
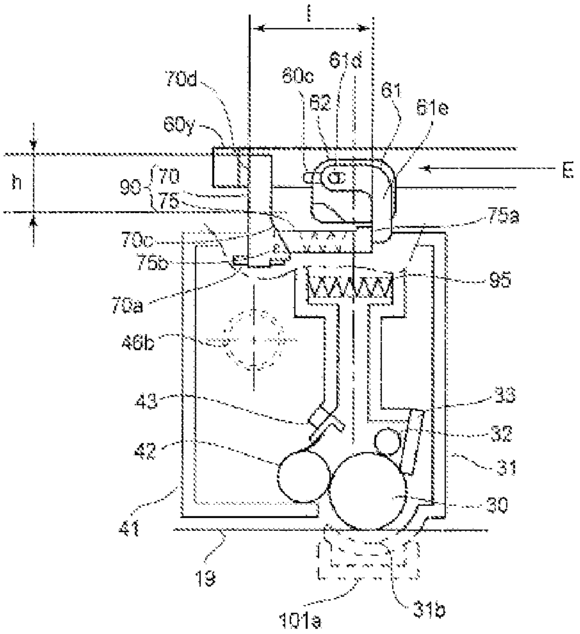
Figure 4:
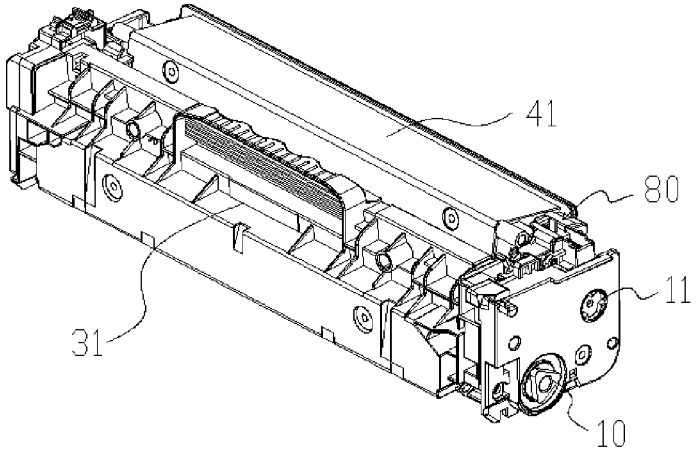
FIG. 4 is a schematic structural view of a processing box in Embodiment 1 of the present invention.
Figure 5:
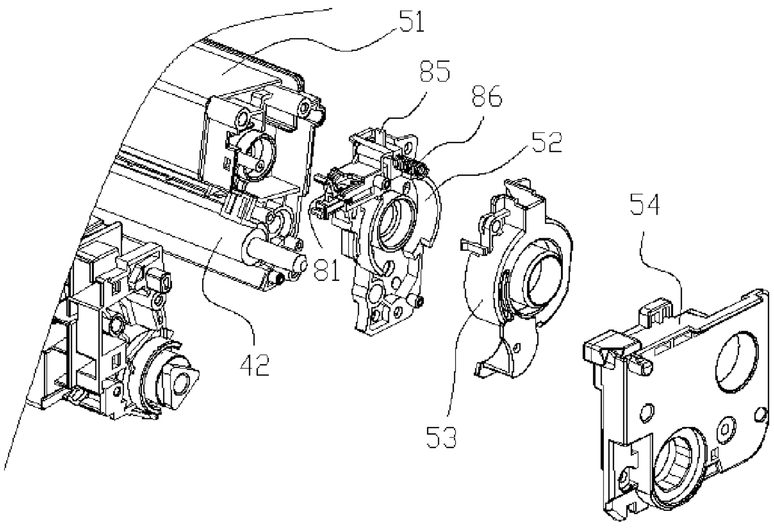
FIG. 5 is a schematic view of an exploded structure of a driving side of a developing unit in Embodiment 1 of the present invention.
Figure 6:
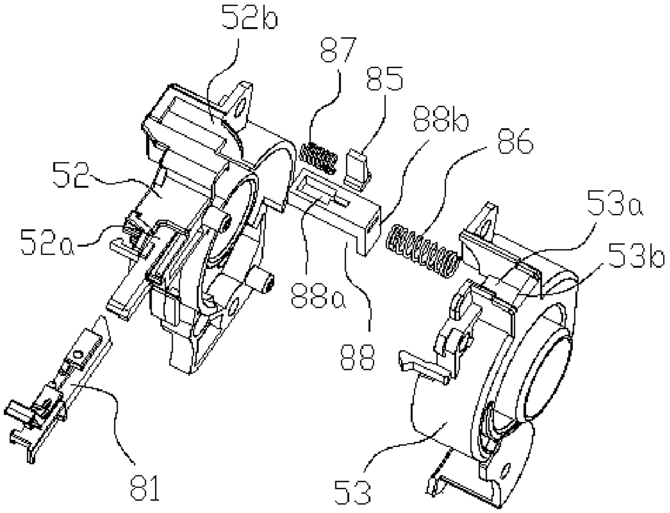
FIG. 6 is a schematic view of an exploded structure of a force receiving assembly in Embodiment 1 of the present invention.
Figure 7:
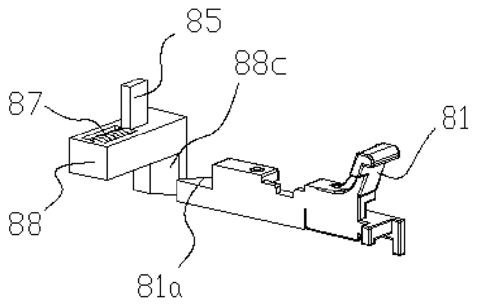
FIG. 7 is a schematic view of a partially exploded structure of a force receiving assembly in Embodiment 1 of the present invention.
Figure 8:
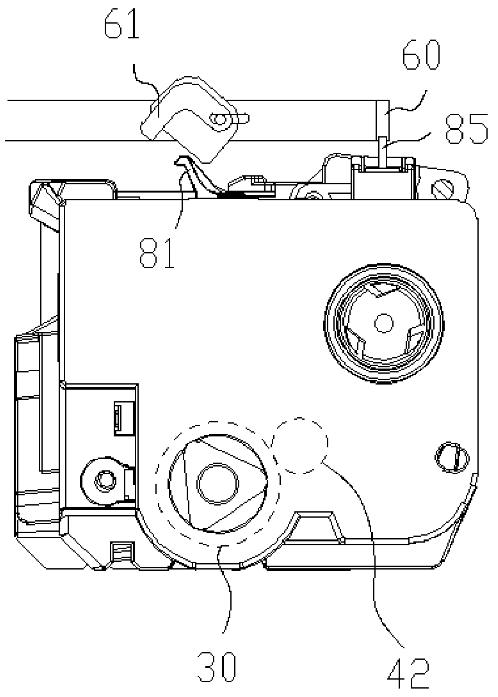
FIGS. 8 and 10 are schematic views of a process of cooperation between the process cartridge in Embodiment 1 of the present invention and the force applying mechanism in image formation.
Figure 9:
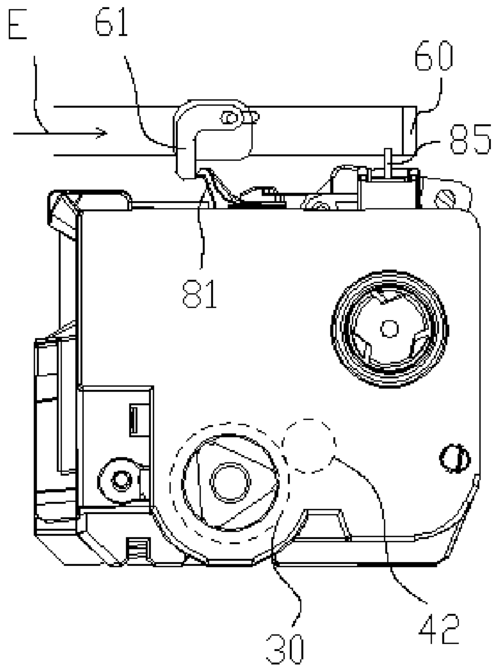
Figure 10:
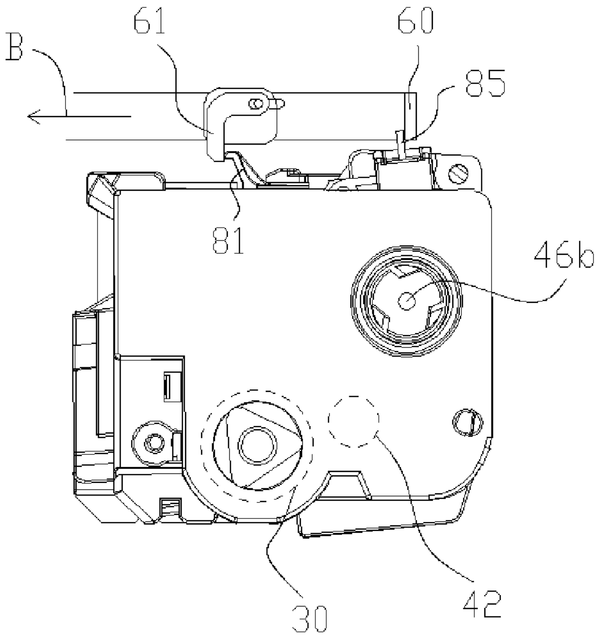
Figure 11:
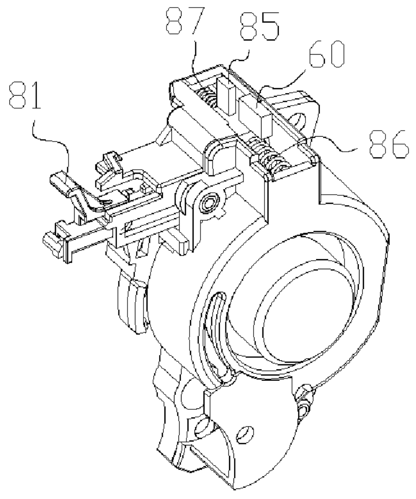
FIGS. 11 and 13 are schematic views of a three-dimensional structure of cooperation between the process cartridge in Embodiment 1 of the present invention and the force applying mechanism in image formation.
Figure 12:
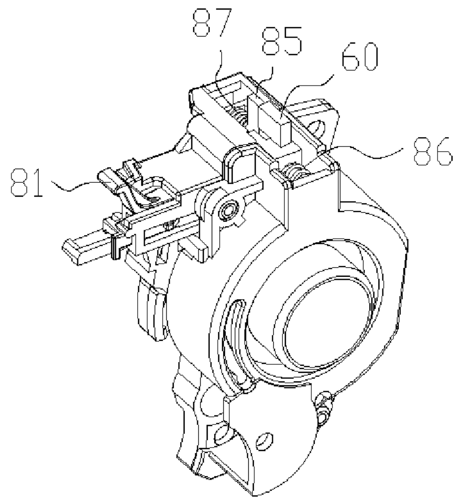
Figure 13:
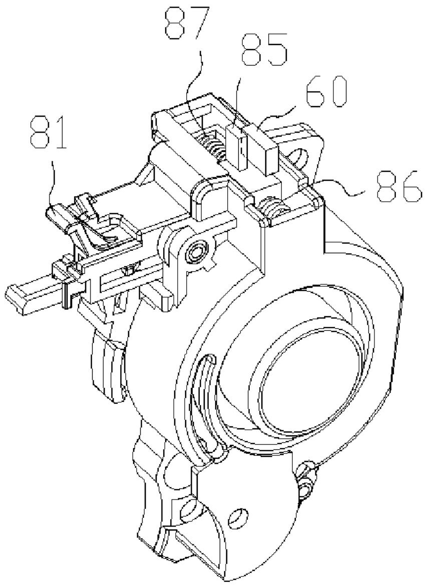

As shown in FIG. 1, an image forming device includes: a tray 13, a first force applying component 61, a second force applying component 60, and a door cover 12.

As shown in FIGS. 4 to 7, a process cartridge of this embodiment includes a photosensitive unit 31 and a developing unit 41. The photosensitive unit 31 includes a first driving force receiving portion 10 for driving a photosensitive drum 30 provided in the photosensitive unit 31. The developing unit 41 is provided with a second driving force receiving portion 11 for driving a developing roller 42 provided in the developing unit 41.

The developing unit 41 includes a force receiving assembly 80, and the force receiving assembly 80 includes a first force receiving portion 81 and a second force receiving portion 85. A developing frame includes a side cover 54, a driving support 53, a supporting support 52 and a main body frame 51. Among them, the side cover 54 is provided on the outermost side of a driving side of the developing unit, the driving support 53 is provided on a side of the side cover 54 close to a longitudinal inner side of the developing unit, the supporting support 52 is provided on a side of the driving support 53 close to the longitudinal inner side of the developing unit, and the supporting support 52 is directly mounted on the main body frame 51 of the developing unit 41. In this embodiment, the first force receiving portion 81 and the second force receiving portion 85 are provided on the supporting support 52. Specifically, a first mounting groove 52*a* and a second mounting groove 52*b* are formed on the supporting support 52, and the first mounting groove 52*a* and the second mounting groove 52*b* have different extending directions. Preferably, the extending direction of the second mounting groove 52*b* is parallel to an axis of the developing roller 42, and the extending directions of the first mounting groove 52*a* and the second mounting groove 52*b* are at 90 degrees. The second force receiving portion 85 is mounted on a sliding base 88. A sliding groove 88*a* is provided on a top surface of the sliding base 88, and the second force receiving portion 85 is mounted in the sliding groove 88*a*. In order to prevent the second force receiving portion 85 from being detached from the sliding groove 88*a*, it is preferable that the second force receiving portion 85 is made into a T-shaped structure, and the sliding groove 88*a* is provided with a T-shaped groove matching the T-shaped structure. A first elastic member 87 is provided between the sliding base 88 and the second force receiving portion 85. One end of the first elastic member 87 abuts against an inner wall of the sliding groove 88*a*, and the other end abuts against the second force receiving portion 85. A third mounting groove 53*a* is provided on the driving support 53. The second mounting groove 52*b* and the third mounting groove 53*a* together form a sliding space of the sliding base 88. A second elastic member 86 is provided between the sliding base 88 and the driving support 53. One end of the second elastic member 86 abuts against an inner wall of the third mounting groove 53*a*, and the other end abuts against an outer surface of the sliding base 88. The sliding base 88 can move relative to the developing frame of the developing unit 41, and the second force receiving portion 85 can move relative to the sliding base 88. Preferably, the extending directions of the moving directions of the sliding base 88 and the second force receiving portion 85 are set to be parallel.

An urging portion 81*a* is provided on the first force receiving portion 81, and an urged portion 88*c* is provided on the sliding base 88. Preferably, both the urging portion 81*a* and the urged portion 88*c* are set as inclined surfaces. The sliding direction of each component can be changed through the cooperation of the urging portion 81*a* and the urged portion 88*c*. In this embodiment, preferably, the first force receiving portion 81 slides in a direction approximately perpendicular to the axis of the developing roller 42, and the sliding base 88 slides in a direction orthogonal to the sliding direction of the first force receiving portion 81. Hereinafter, the process of mounting the process cartridge of the present invention into the image forming device and the process of separating the drum and roller will be described in conjunction with FIGS. 6 to 13.

A longitudinal direction of the developing unit 41 is an axial direction of the developing roller 42. First, the process cartridge is mounted into the image forming device with the tray and mounted to a preset position. As the door cover 12 in the image forming device is closed, the first force applying component 61 rotates and then presses the first force receiving portion 81. After the first force receiving portion 81 moves, the urged portion 88*c* is pressed by the urging portion 81*a*. The sliding base 88 overcomes the elastic force of the second elastic member 86 and moves from a position away from the side cover 54 to a position close to the side cover 54. The second force receiving portion 85 slides together with the sliding base 88 until the second force receiving portion 85 comes into contact with the second force applying component 60 in the image forming device. Specifically, the second force applying component 60 is in contact with the second force receiving portion 85 in the longitudinal direction of the developing unit and is arranged to overlap back and forth in the longitudinal direction. At this time, the first force applying component 61 continues to push the first force receiving portion 81 to move, and the sliding base 88 continues to slide along the longitudinal direction of the developing unit. The second force receiving portion 85 is blocked by the second force applying component 60 to stop sliding, the first elastic member 87 is compressed, and the second force receiving portion 85 has a tendency to move closer to the second force applying component 60 relative to the second force applying component 60 under the action of the elastic force of the first elastic member 87. Subsequently, the machine is pre-operated, and the second force applying component 60 will move along an E direction in FIG. 9. When viewed along the longitudinal direction of the developing unit, the second force applying component 60 cancels the blocking of the second force receiving portion 85, and the second force receiving portion 85 moves along the longitudinal direction of the developing unit 41 under the action of the elastic force of the first elastic member 87. At this time, the second force receiving portion 85 enters an overlapping space with the second force applying component 60 in the longitudinal direction of the developing unit 41. When the image forming device drives the second force applying component 60 to move in a direction B in FIG. 10, the second force applying component 60 applies a force to the second force receiving portion 85 to separate the developing roller 42 from the photosensitive drum 30. When the door cover 12 in the image forming device is opened, the first force applying component 61 rotates upward to cancel the pressing force on the first force receiving portion 81, the first force receiving portion 81 cancels the pressing on the sliding base 88, and the second force receiving portion 85 returns to a position farther away from the side cover 54 as the sliding base 88 is urged by the elastic force of the second elastic member 86. At this time, in the longitudinal direction of the developing unit, the second force receiving portion 85 and the second force applying component 60 are in a non-overlapping position, and a developing cartridge can be taken out smoothly.

Embodiment 2

Figure 14:
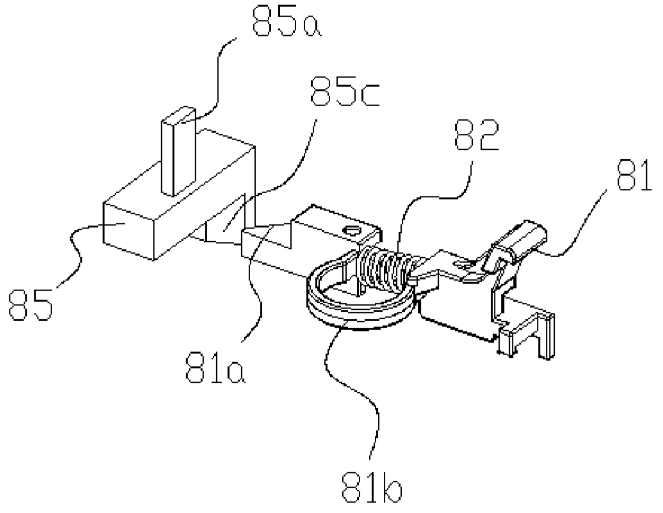
FIG. 14 is a partially exploded schematic view of a force receiving assembly in Embodiment 2 of the present invention.

Embodiment 2 of the present invention will be introduced below. As shown in FIG. 14, Embodiment 2 of the process cartridge of the present invention is different from Embodiment 1 that the internal structure of the force receiving assembly is different.

As shown in FIG. 14, with respect to Embodiment 1, the second force receiving portion 85 in the force receiving assembly in this embodiment is provided as an integral structure. The second force receiving portion 85 includes an urged portion 85*c* and a force receiving part 85*a*. An elastic part 81*b* is provided on the first force receiving portion 81. When a force receiving part 85*a* is in contact with the second force applying component 60 and is blocked, an elastic force is provided by the deformation of an elastic part 81*b* of the first force receiving portion 81 so that the force receiving part 85*a* has a tendency to move closer to the second force applying component 60 relative to the second force applying component 60. Preferably, in order to strengthen the elastic force and stability of the above elastic part 81*b*, a third elastic member 82 is added to the elastic part 81*b*. Optionally, it is also possible to directly replace the elastic part 81*b* with the third elastic member 82 to provide the elastic force.

Embodiment 3

Embodiment 3 of the present invention will be introduced below. In this embodiment, the first force receiving portion does not receive the force of the first force applying component linked with the door cover in the image forming device.

Figure 15:
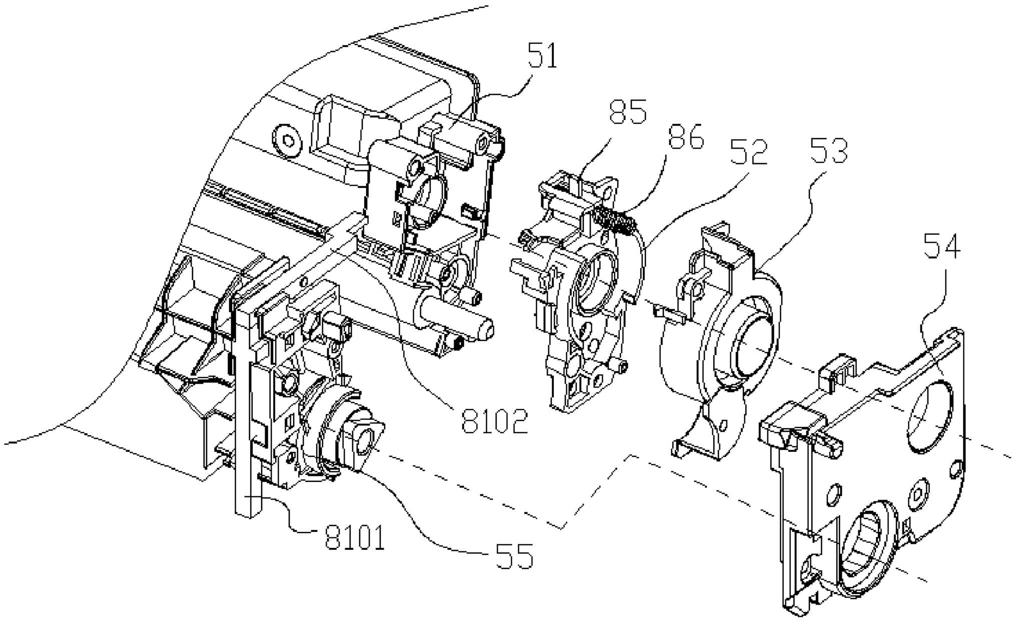
FIG. 15 is a schematic view of an exploded structure of a driving side of a process cartridge in Embodiment 3 of the present invention.
Figure 16:
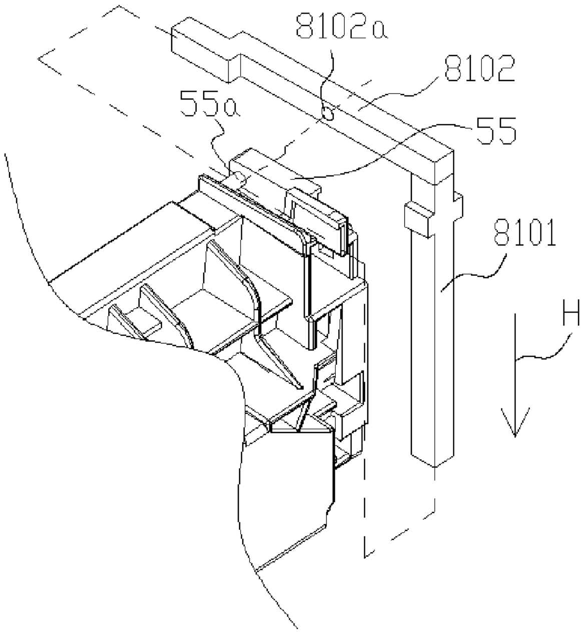
FIG. 16 is a schematic view of an exploded structure of a first force receiving portion and a middle piece in Embodiment 3 of the present invention.
Figure 17:
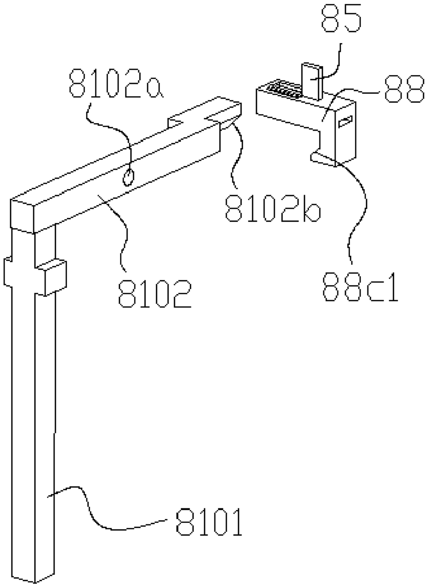
FIG. 17 is a schematic view of a partially exploded structure of a force receiving assembly in Embodiment 3 of the present invention.

Specifically, as shown in FIGS. 15 to 17, since the tray 13 will drive the cartridge to descend along an H direction in FIG. 16 during a process of closing the door cover 12 of the image forming device, a first force receiving portion 8101 and a middle piece 8102 are provided by using this action. The first force receiving portion 8101 extends approximately along a descending direction of the developing unit. The middle piece 8102 can rotate about a protruding column 55*a* provided on a photosensitive unit support 55. Specifically, a hole 8102*a* is provided on the middle piece 8102, and cooperates with the protruding column 55*a* so that the middle piece 8102 can rotate about the protruding column 55*a*. When the developing unit descends along the H direction, the first force receiving portion 8101 will cooperate with the force applying component (not shown in the figure) located at the bottom of the image forming device, and the first force receiving portion 8101 will be lifted. The first force receiving portion 8101 urges the middle piece 8102 to rotate. A urging portion 8102*b* provided on the middle piece 8102 is in contact with the urged portion 88*c*1 provided on the sliding base 88 and causes the second force receiving portion 85 to move closer to the second force applying component 60. Thereafter, the second force applying component 60 cooperates with the second force receiving portion 85 and applies force so that the developing roller in the developing unit is separated from the photosensitive drum in the photosensitive unit, and this process is similar to that in Embodiment 1. When the door cover 12 is opened, the tray 13 drives the developing unit to move upward, the image forming device cancels the pressing on the first force receiving portion 8101, the second force receiving portion 85 returns under the elastic force of the second elastic member 86, and the developing unit can be taken out smoothly.

Embodiment 4

Figure 18:
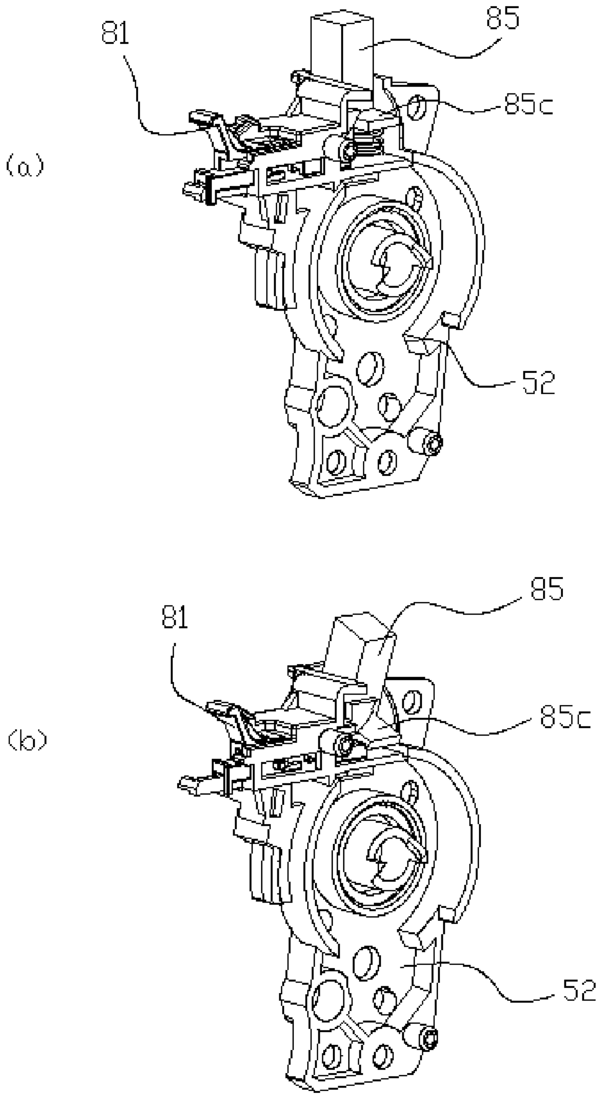
FIG. 18 is a schematic view of a partial structure of a force receiving assembly in Embodiment 4 of the present invention.

Embodiment 4 of the present invention will be introduced below. As shown in FIG. 18, in this embodiment, the second force receiving portion 85 is provided in a rotatable form. Specifically, a rotation fulcrum at which the second force receiving portion 85 can rotate is provided on the developing frame of the developing unit 41, and the second force receiving portion 85 is mounted on the above rotation fulcrum. When the process cartridge is not mounted in the image forming device, the second force receiving portion 85 is in a position protruding from the developing frame. When the process cartridge is mounted into the image forming device, as the door cover 12 is closed, the first force receiving portion 81 will receive the force of the first force applying component 61 in the image forming device and move, and the second force receiving portion 85 will receive the force from the first force receiving portion 81 and makes a rotational movement from an initial position. Specifically, the rotational movement is rotation of the force receiving part of the force receiving portion 85 in a direction close to the side cover 54, as long as the position after the rotation of the second force receiving portion 85 overlaps with the second force applying component 60 in a height direction of the process cartridge. The above height direction is a direction in which the process cartridge rises or falls with the tray 13 in the image forming device. In other words, it is a direction of gravity. After the second force receiving portion 85 receives a force, in the direction of gravity, the height of the position of the force receiving part of the second force receiving portion 85 that receives the force of the second force applying component 60 after the movement is lower than the height of the position before the movement. The position after the movement mentioned above refers to a position of the force receiving part of the second force receiving portion 85 in the direction of gravity after the first force receiving portion 81 receives the force of the first force applying component 61 to move and force the second force receiving portion 85 to move. The position before the movement mentioned above refers to a position of the force receiving part of the second force receiving portion 85 in the direction of gravity in a free state, that is, when the first force receiving portion 81 is not subject to an external force. Preferably, an outer contour of a part of the second force receiving portion 85 protruding from the outside of the developing frame can be made into a circular arc shape. Specifically, the second force receiving portion 85 is set into a fan shape, and when the second force receiving portion 85 rotates, since its outer contour is set into a circular arc shape, it is possible to make the cooperation between the second force receiving portion 85 and the first force receiving portion 81 more stable, and to make the mechanical strength of the second force receiving portion 85 to be strengthened.

Figure 19:
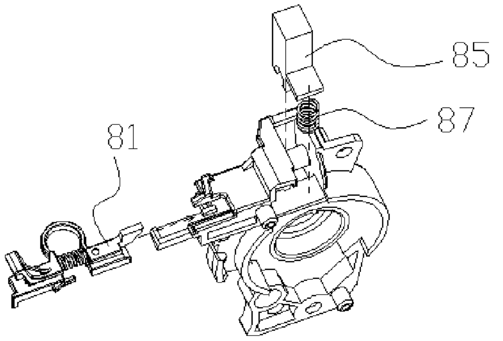
FIG. 19 is a schematic view of an exploded structure of a force receiving assembly in Embodiment 4 of the present invention.
Figure 20:
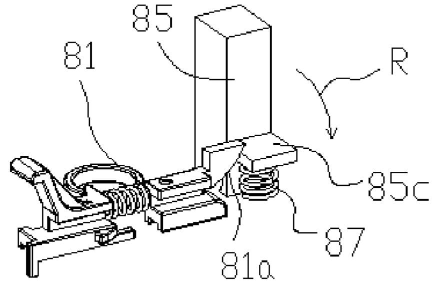
FIG. 20 is a schematic view of a partially exploded structure of the force receiving assembly in Embodiment 4 of the present invention.

As shown in FIGS. 19 and 20, in this embodiment, an urged portion 85*c* protruding laterally is formed on the second force receiving portion 85. Preferably, the protruding direction of the urged portion 85*c* is a direction close to the side cover 54. When the first force receiving portion 81 receives the force of the first force applying component 61, it moves closer to the second force receiving portion 85, and an urging portion 81*a* on the first force receiving portion 81 presses the urged portion 85*c*, so that a force receiving part of the second force receiving portion 85 rotates along an R direction. When the external force on the first force receiving portion 81 is cancelled, the second force receiving portion 85 returns to a free state under the action of the elastic force of the first elastic member 87.

Embodiment 5

Figure 21:
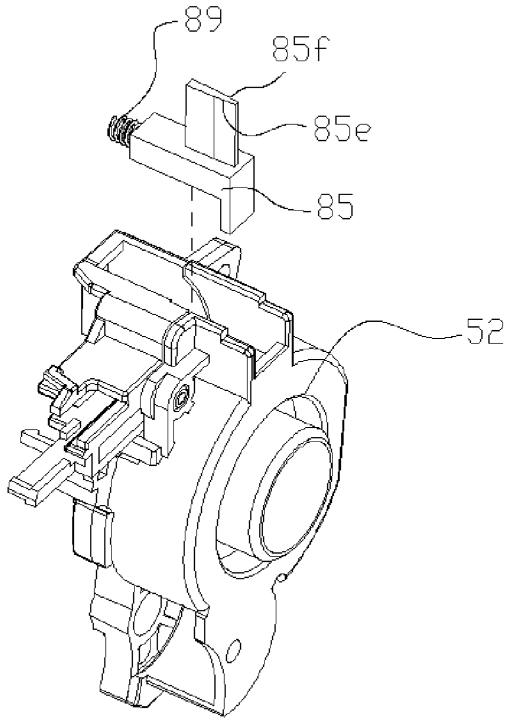
FIGS. 21 and 22 are schematic views of a partially exploded structure of a force receiving assembly in Embodiment 5 of the present invention.
Figure 22:
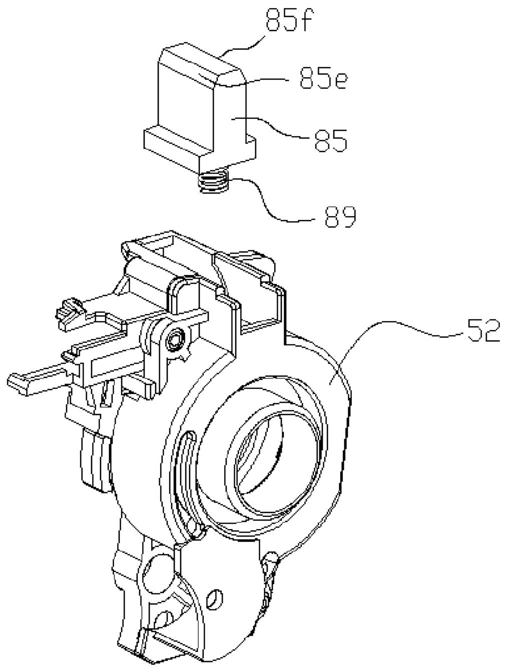

Embodiment 5 of the present invention will be introduced below. As shown in FIGS. 21 and 22, the first force receiving portion 81 is eliminated in this embodiment, and the second force receiving portion 85 is made into a form that can move in the direction of gravity or in the longitudinal direction of the process cartridge. When the second force receiving portion 85 moves in the longitudinal direction of the process cartridge, as shown in FIG. 21, a side of the second force receiving portion 85 close to the side cover 54 is provided with a first inclined surface 85*e* and a second inclined surface 85*f*, and a side of the second force receiving portion 85 away from the side cover 54 is provided with a fourth elastic member 89. With the abutment of the second inclined surface 85*f* with the first force applying component 61, the second force receiving portion 85 may be urged to overcome the elastic force of the fourth elastic member 89 to move toward the side away from the side cover 54 so as to pass over the first force applying component 61. Then, the second force receiving portion 85 moves closer to the second force applying component 60 under the elastic force of the fourth elastic member 89 to receive a force for separating the developing roller 42 and the photosensitive drum 30, and the use of the first inclined surface 85*e* allows the process cartridge to pass over the first force receiving portion 81 when being taken out. Considering that when the second force applying component 60 applies pressure to the second inclined surface 85*f*, the second inclined surface 85*f* may slide relative to the second force applying component 60, and the developing roller 42 and the photosensitive drum 30 cannot be separated. In this embodiment, the elastic force of the fourth elastic member 89 is set to provide an elastic force to block the movement of the second force receiving portion 85 when the second force applying component 60 urges the second force receiving portion 85, so that the second force receiving portion 85 can receive a force for separating the developing roller and the photosensitive drum.

When the second force receiving portion 85 moves in the direction of gravity, as shown in FIG. 22, it is similar to the manner in which the second force receiving portion 85 is set to move in the longitudinal direction, except that the inclined surfaces 85*e*, 85*f* provided on the second force receiving portion 85 are provided at a top end of the second force receiving portion 85 in the direction of gravity. The moving direction of the second force receiving portion 85 is also set along the direction of gravity. When the process cartridge is mounted and taken out, the inclined surface of the second force receiving portion 85 is in contact with the first force applying component 61 in the gravity direction and allows the second force receiving portion 85 to pass over the first force applying component.

Embodiment 6

Embodiment 6 of the present invention will be introduced below. In this embodiment, the second force receiving portion 85 is directly fixedly mounted on the developing frame, and the second force receiving portion 85 is made of an elastic material. When the process cartridge moves along a tray advancing direction (D1 direction) with the tray 13, the second force receiving portion 85 made of the elastic material can be pressed by the first force applying component 61 and the second force applying component 60 in the image forming device to be elastically deformed until it finally abuts against the second force applying component 60. At this time, the second force receiving portion 85 elastically abuts against the second force applying component 60. When the second force applying component 60 moves in a B direction (refer to FIG. 9), as long as the elastic deformation force of the second force applying component 60 is set to be greater than the urging force of urging the developing roller 42 to contact the photosensitive drum 30, the developing roller 42 can be separated from the photosensitive drum 30 when the second force receiving portion 85 receives the force of the second force applying component 60. Even though the second force receiving portion 85 has undergone elastic deformation during the period, the developing roller 42 and the photosensitive drum 30 can still be separated by a small distance, thereby avoiding the contact between the developing roller 42 and the photosensitive drum 30. Optionally, the second force receiving portion 85 may not be completely fixedly mounted on the developing frame, or it may be allowed to have a small amount of movement relative to the developing frame to improve the smoothness of mounting and removal of the process cartridge. The setting range only needs to be referred to so that the second force receiving portion 85 can receive the force of the second force applying component 60 to force the developing roller 42 to be separated from the photosensitive drum 30.

Embodiment 7

Figure 23:
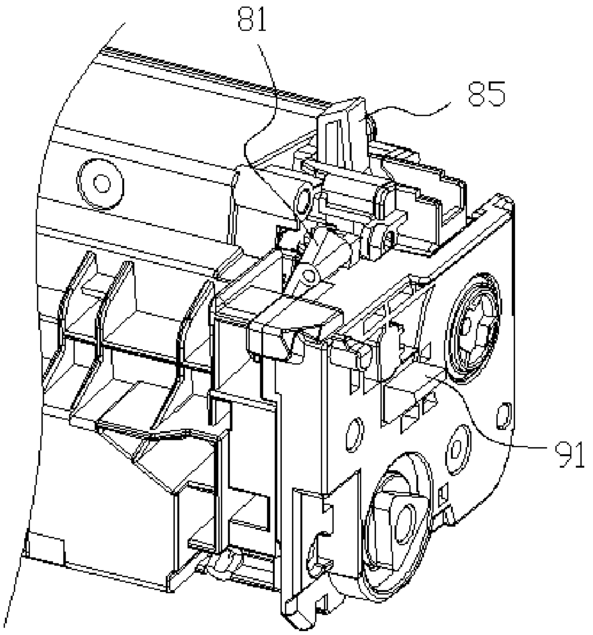
FIG. 23 is a schematic view of a partially exploded structure of a force receiving assembly in Embodiment 7 of the present invention.
Figure 24:
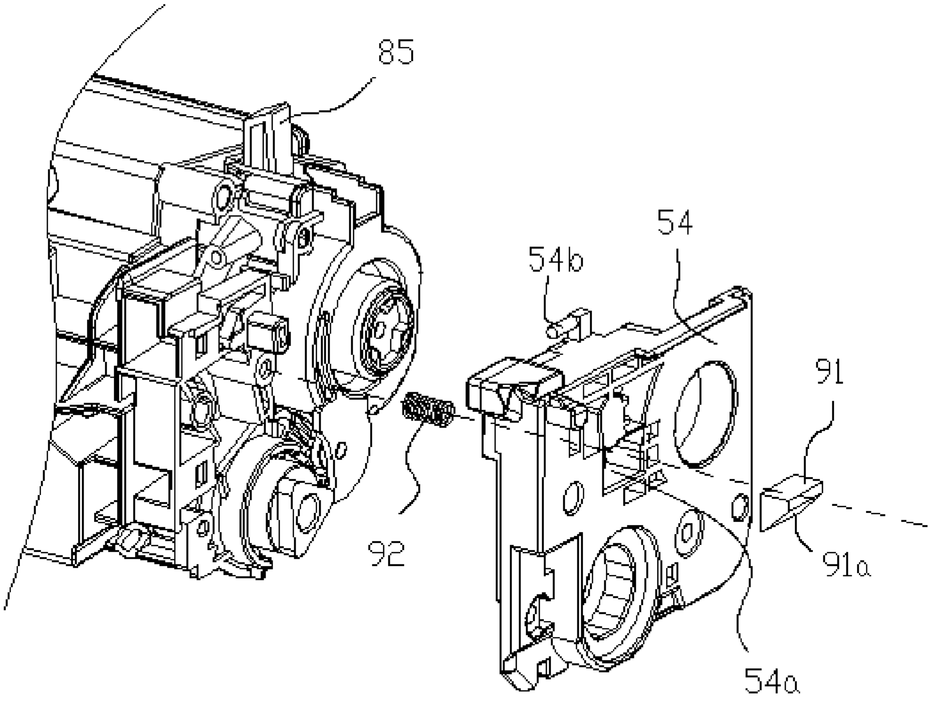
FIG. 24 is a schematic view of an exploded structure of a housing offset mechanism in Embodiment 7 of the present invention.
Figure 25:
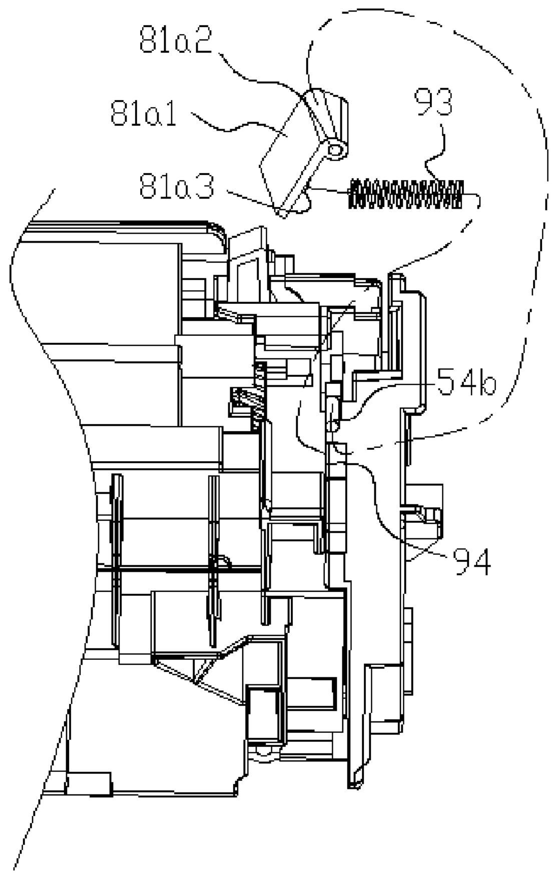
FIG. 25 is a schematic view of an exploded structure of a first force receiving portion in Embodiment 7 of the present invention.
Figure 26:
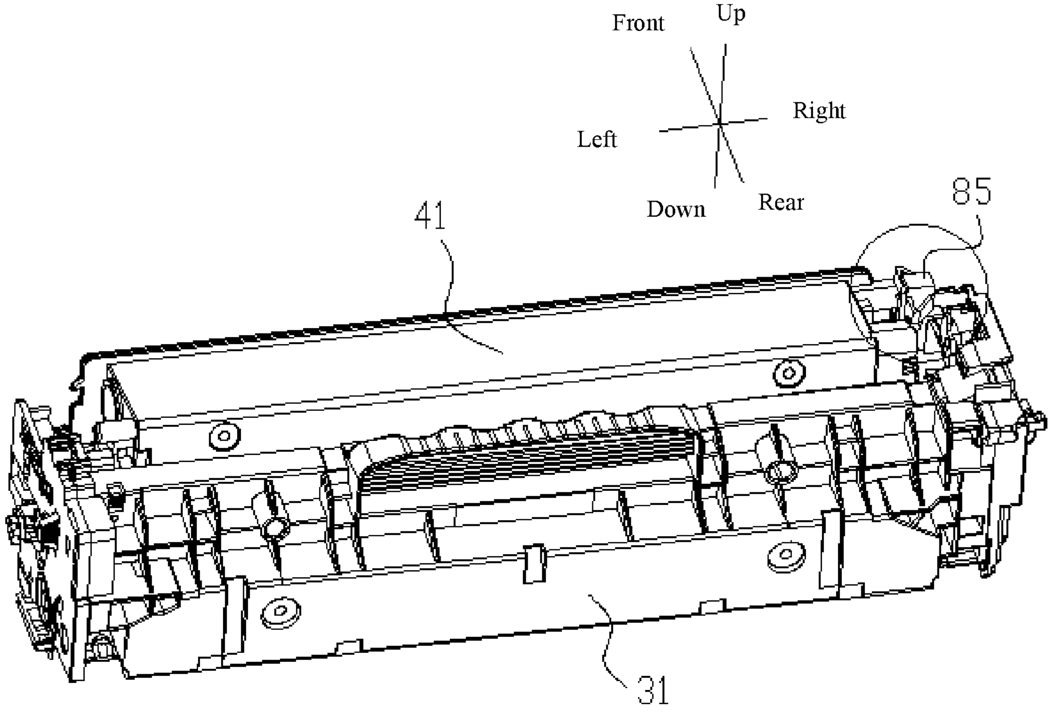
FIG. 26 is a schematic view of an overall structure of a process cartridge in Embodiment 8 of the present invention.
Figure 27:
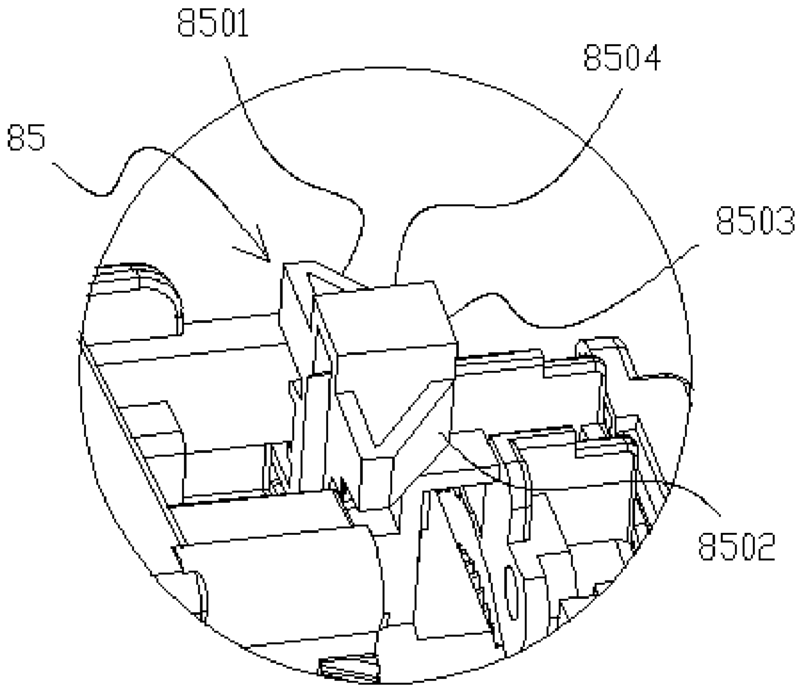
FIG. 27 is a schematic view of a partially enlarged structure of a second force receiving portion in Embodiment 8 of the present invention.

Embodiment 7 of the present invention will be introduced below. Embodiment 7 of the present invention is as shown in FIGS. 23 to 25. In this embodiment, the second force receiving portion 85 is integrally molded with the developing frame or fixedly mounted on the developing frame.

As shown in FIGS. 23 to 25, in this embodiment, the process cartridge has a housing biasing mechanism, including a biasing elastic member 92 and a biasing abutment block 91. A hole 54*a* through which the biasing abutment block 91 can pass is provided on the side cover 54. One end of the biasing elastic member 92 abuts against the developing frame, and the other end abuts against the biasing abutment block 91. A lower side of the biasing abutment block 91 is provided with an inclined guide surface 91*a*. When the process cartridge is mounted into the tray 13, the inclined guide surface 91*a* can come into contact with the inner side wall of the tray 13 and urge the process cartridge to a side away from the first force applying component 61 and the second force applying component 60 in the image forming device through the biasing elastic member 92. After the process cartridge is urged, the second force receiving portion 85 is on a side of the second force applying component 60 in the longitudinal direction of the process cartridge, and the second force receiving portion 85 avoids interference with the second force applying component 60 in a pushing direction D1 of the tray 13. The process cartridge can be mounted into the image forming device smoothly following the tray 13. After the process cartridge is mounted at a predetermined position in the image forming device following the tray 13, as the door cover 12 in the image forming device is closed, the first force applying component 61 will rotationally move downward. A force receiving surface 81*a*1 is provided on the first force receiving portion 81 of the process cartridge, and the receiving surface 81*a*1 receives a force applied by the downward rotational movement of the first force applying component 61. A rotary mounting hole 81*a*2 and a return elastic member abutment portion 81*a*3 are further provided on the first force receiving portion 81, and a return elastic member 93 is provided between the first force receiving portion 81 and the process cartridge frame. A rotary mounting column 54*b* is provided on the side cover 54, and the rotary mounting hole 81*a*2 is mounted into the rotary mounting column 54*b*. One end of the return elastic member 93 abuts against the return elastic member abutment portion 81*a*3 of the first force receiving portion 81, and the other end abuts against the process cartridge frame. The elastic force of the return elastic member 93 is set to be greater than that of the biasing elastic member 92. When the first force applying component 60 applies a force to the first force receiving portion 81, the first force receiving portion 81 applies a force to the process cartridge frame through the return elastic member 93, so that the process cartridge frame moves close to the second force applying component 60 in the longitudinal direction of the process cartridge. As in the above embodiment, when the image forming device is not pre-operated, as the process cartridge frame moves close to the second force applying component 60 in the longitudinal direction of the process cartridge, the second force receiving portion 85 will be blocked by the second force applying component 60 during the movement, and abuts against the second force applying component 60. At this time, the first force receiving portion 81 has received the force of the first force applying component 61 and rotates about the rotary mounting column 54*b* to a preset position, and the return elastic member 93 is compressed to accumulate elastic potential energy. When the image forming device starts to be pre-operated, the second force applying component 60 retracts and moves in the pushing direction of the tray 13, and the blocking of the second force receiving portion 85 by the second force applying component 60 is released. The elastic potential energy accumulated by the return elastic member 93 will force the process cartridge frame to move closer to the second force applying component 60. Since the elastic force of the return elastic member 93 is set to be greater than the elastic force of the biasing elastic member 92, the process cartridge frame moves closer to the second force applying component 60 to overcome the elastic force of the biasing elastic member 92 to move. The second force receiving portion 85 moves along with the process cartridge frame to a position that overlaps with the second force applying component 60 in the pushing direction D1 of the tray 13. Then, the image forming device continues to be pre-operated. The second force applying component 60 moves along an elongated direction (D2 direction) of the tray 13 and pushes the second force receiving portion 85 to move so that the developing roller is separated from the photosensitive drum. When the process cartridge needs to be taken out, the door cover 12 is opened, the first force applying component 61 releases the force on the first force receiving portion 81, and the pressing of the first force receiving portion 81 on the return elastic member 93 is also released immediately. The process cartridge moves away from the second force applying component 60 under the action of the elastic force of the biasing elastic member 92. The overlap of the second force receiving portion 85 with the second force applying component 60 in the elongated direction (D2 direction) of the tray 13 is released. The process cartridge can be pulled out smoothly following the tray 13.

Embodiment 8

Embodiment 8 of the present invention will be introduced below. In this embodiment, a solution in which the process cartridge can be translated as a whole is adopted. In this embodiment, it is only necessary to provide the second force receiving portion and not to provide the first force receiving portion.

Figure 28:
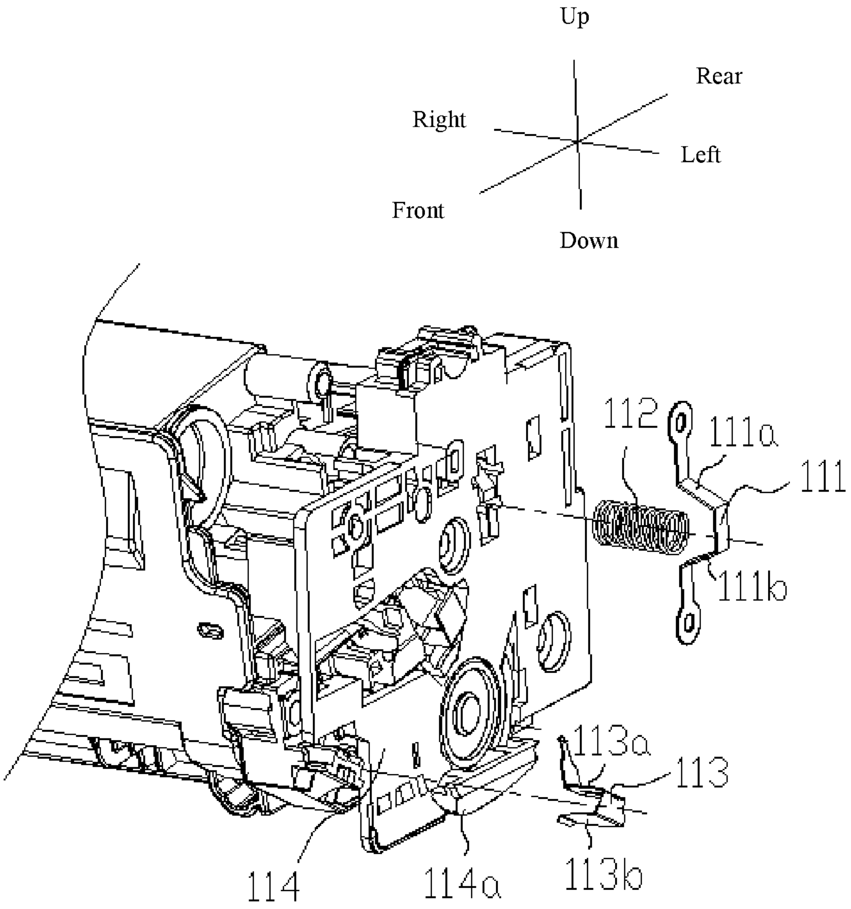
FIG. 28 is a schematic view of a partially exploded structure of a conductive side of the process cartridge in Embodiment 8 of the present invention.
Figure 29:
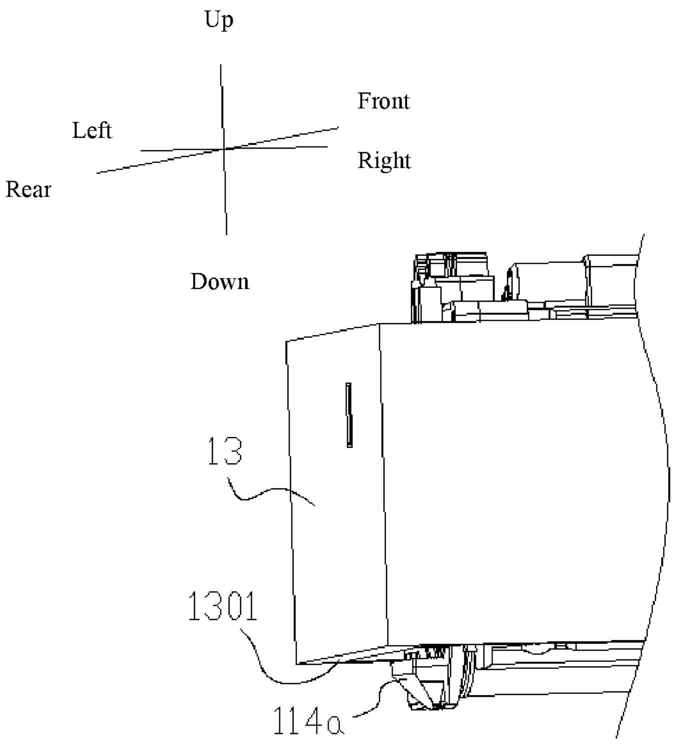
FIG. 29 is a schematic view of a partial structure of a conductive side of the process cartridge in Embodiment 8 of the present invention mounted into a tray.

As shown in FIGS. 26 to 35, for the convenience of description, each direction and position in the process cartridge in this embodiment, Embodiments 1 to 7 described previously, as well as other embodiments described later, are defined as follows. The longitudinal direction of the process cartridge, that is, the axial direction of the photosensitive drum, is referred to as a left-and-right direction, a side of the process cartridge on the driving side is referred to as right, a driving opposite side of the process cartridge is referred to as left, a direction in which the process cartridge is pushed into the image forming device with the tray is referred to as front, a direction in which the tray is taken out from the image forming device is referred to as rear, and after the process cartridge is mounted into the tray, a vertical upward direction is referred to as up, and a vertical downward direction is referred to as down. The second force receiving portion 85 is provided on a right side of the process cartridge close to the driving side. The second force receiving portion 85 is provided with a mounting guide portion 8501, a disassembly guide portion 8502, a side abutting portion 8503, and a separating force receiving portion 8504 thereon. Preferably, the mounting guide portion 8501 is set as a mounting guide inclined surface, and the disassembly guide portion 8502 is set as a disassembly guide inclined surface. When the process cartridge is mounted into the image forming device along a forward direction with the tray, the mounting guide portion 8501 can abut against the first force applying component 61 and the second force applying component 60, and force the process cartridge to move to the left, so that the second force receiving portion 85 can pass over the first force applying component 61 and the second force applying component 60 smoothly. When the process cartridge is disassembled along a backward direction with the tray, the disassembly guide portion 8502 can abut against the second force applying component 60 and the first force applying component 61, and force the process cartridge to move to the left, wherein the mounting guide portion 8501 and the disassembly guide portion 8502 have different inclination directions. Along a direction from rear to front, the mounting guide portion 8501 itself is closer to the driving opposite side (that is, closer to the left) at a front end position closer to the front relative to a rear end position closer to the rear, and the disassembly guide portion 8502 itself is farther from the driving opposite side (that is, closer to the right) at a front end position closer to the front relative to a rear end position closer to the rear. As shown in FIGS. 28 and 29, a plurality of electrical contact components are provided on the driving opposite side of the process cartridge. The plurality of electrical contact components include a first electrical contact component 111 and a second electrical contact component 113 that transmit electric energy to different components in the process cartridge, respectively. Here, the driving opposite side of the process cartridge is referred to as a conductive side. The plurality of electrical contact components are in contact with electrical transmission components in the tray and are set into an elastically movable structure. Specifically, the first electrical contact component 111 includes two elastic connecting arms 111*a* and 111*b*, and the second electrical contact component 113 also includes two elastic connecting arms 113*a* and 113*b*. When the first electrical contact component 111 and the second electrical contact component 113 are mounted into the process cartridge, the connecting arms 111*a*, 111*b*, 113*a* and 113*b* are all in a suspended state without contacting a side wall of the process cartridge. Therefore, when the first electrical contact component 111 and the second electrical contact component 113 receive a leftward force, the process cartridge moves to the left relative to the tray 13, and then the connecting arms 111*a*, 111*b*, 113*a* and 113*b* will be elastically deformed to accumulate elastic potential energy and apply a force to the process cartridge so that the process cartridge has a tendency to move to the right. In order to increase the elastic force of the electrical contact component, for example, an elastic component 112 may be added between the first electrical contact component 111 and the housing. The elastic component 112 may be a spring, an elastic rubber or the like. A conductive side cover 114 is provided on the conductive side. At a lower end of the conductive side cover 114, specifically, relative to the tray 13, a protective protrusion 114*a* is formed below the lowermost side of the tray 13, and the protective protrusion 114*a* protrudes to the left from the conductive side cover 114, which prevents the electrical contact components 111 and 113 that also protrude to the left from being hung on the upper end surface of the tray when the process cartridge is mounted into the tray from top to bottom. The height of the protective protrusion 114*a* protruding to the left may be slightly smaller than the height of the electrical contact component protruding to the left, or directly greater than the height of the electrical contact component protruding to the left. At the same time, the protective protrusion 114*a* is set to protrude on the lowermost side of the tray 13, which can ensure that the process cartridge has a sufficient stroke during the process of moving to the left without touching the left inner wall of the tray and restricting the stroke of the process cartridge moving to the left. Optionally, in order to have the force of moving the process cartridge to the right after moving to the left relative to the tray, it is not limited to set the electrical contact component to be elastic, and it is also possible to directly provide an elastic member between the conductive side cover 114 and the other main body of the process cartridge to form an elastic force to force the process cartridge to move to the right, or use an elastic electrical contact component in the tray or the image forming device itself to directly provide an elastic force to force the process cartridge to move to the right.

Figure 30:
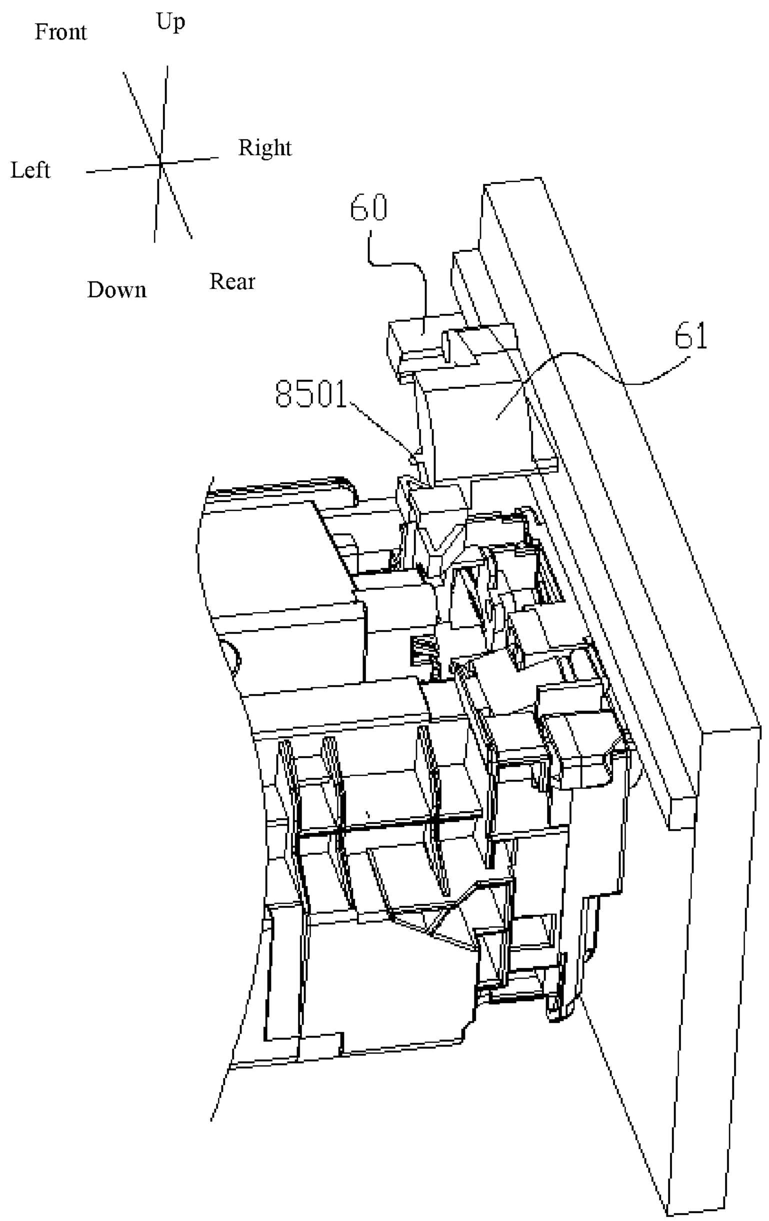
FIGS. 30 and 31 are schematic structural views of different states in which the process cartridge in Embodiment 8 of the present invention is mounted into the image forming device with the tray.
Figure 31:
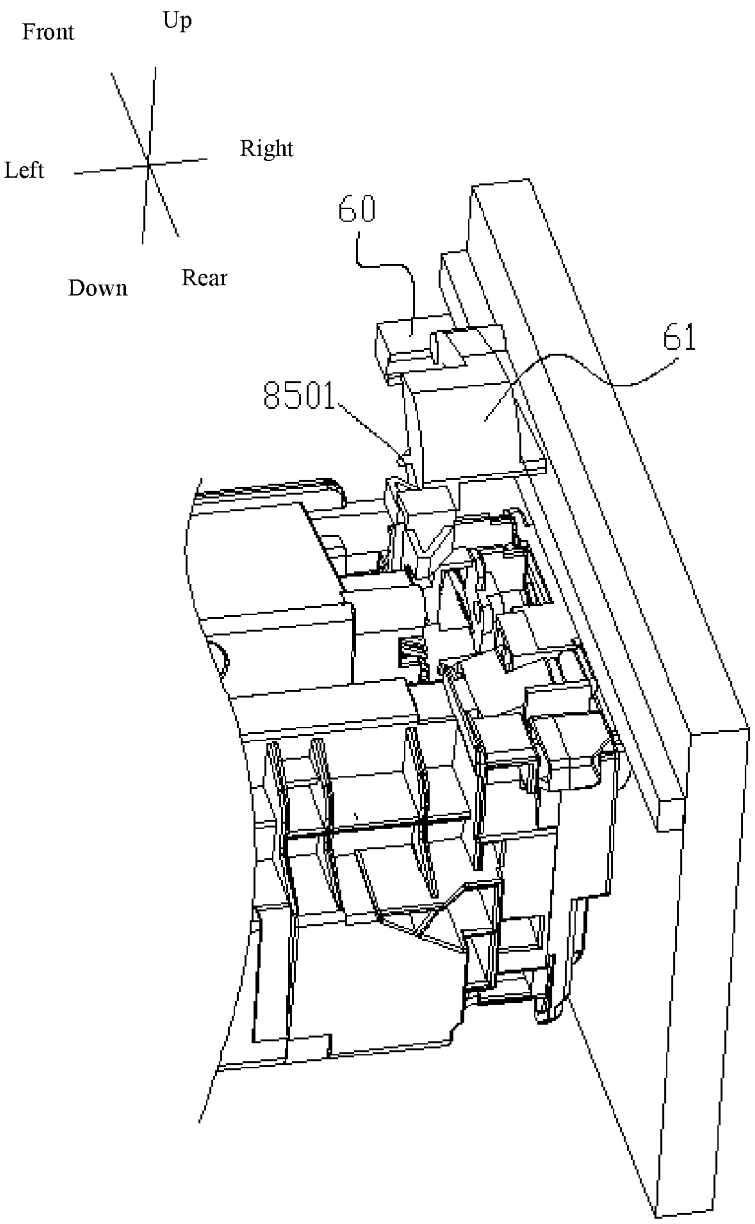
Figure 32:
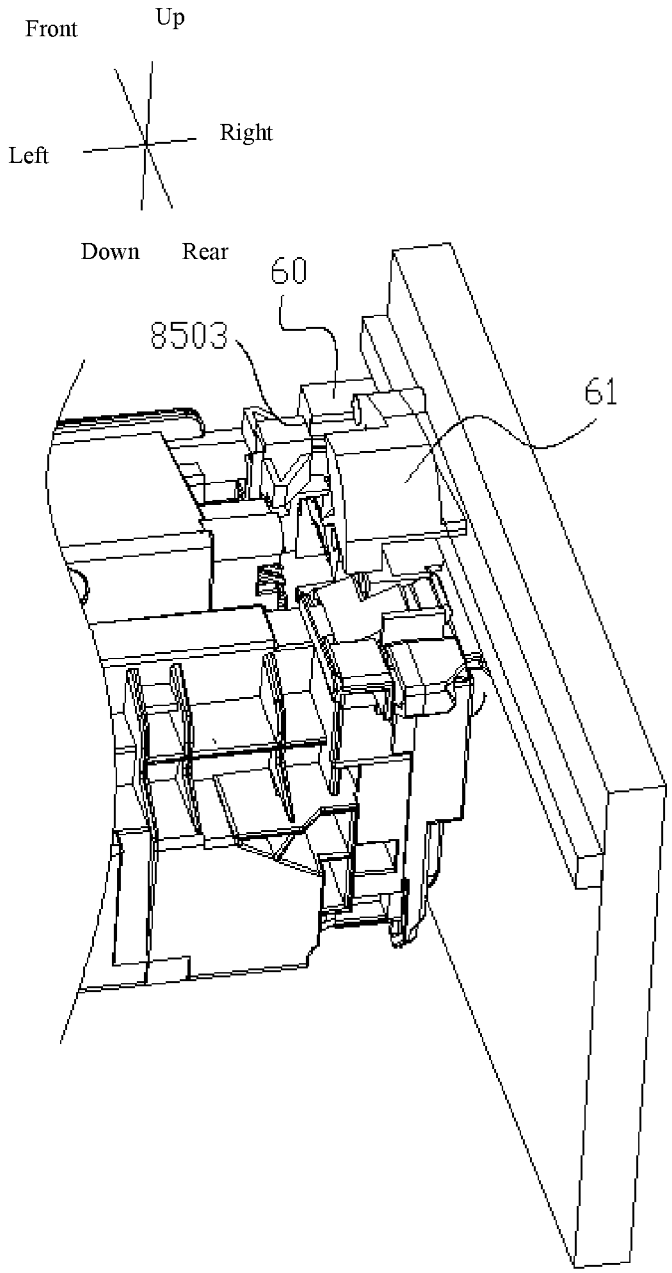
FIGS. 32 and 33 are schematic structural views in a first state in which the second force receiving portion in Embodiment 8 of the present invention cooperates with a second force applying component in the image forming device.
Figure 33:
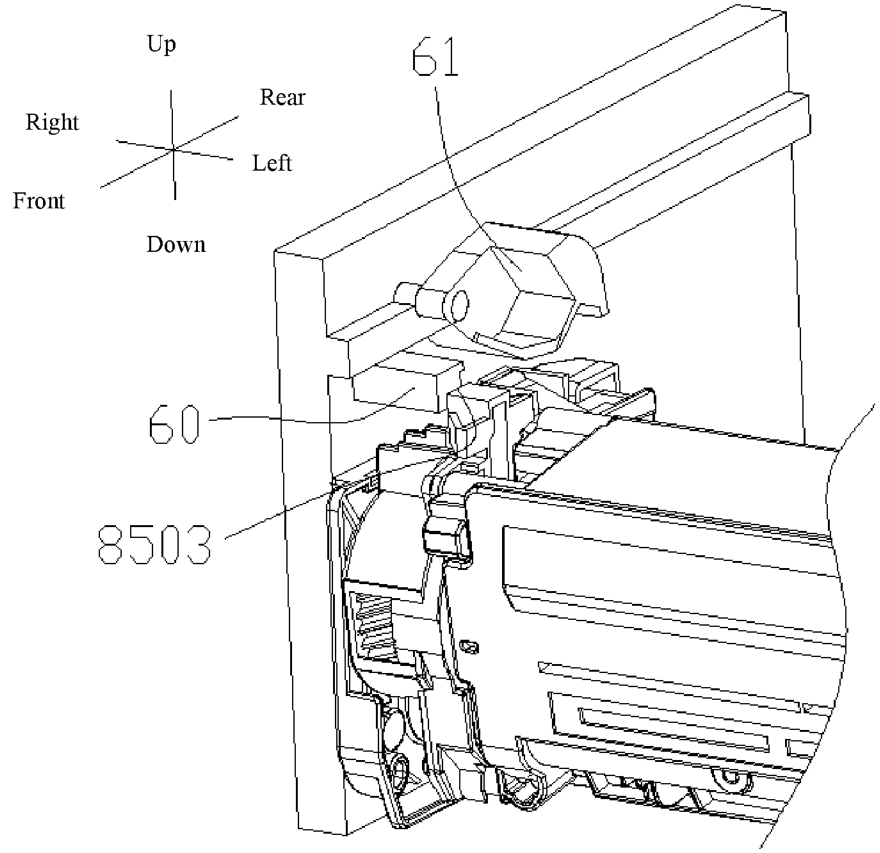
Figure 34:
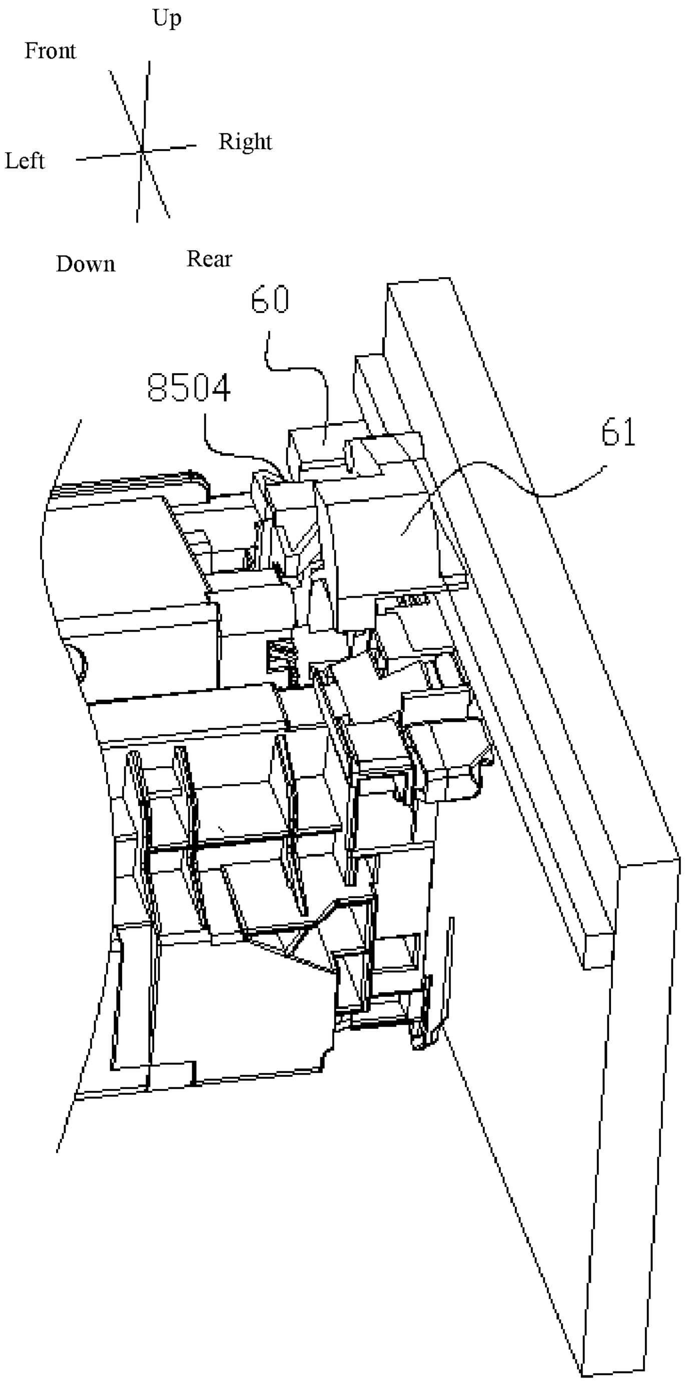
FIGS. 34 and 35 are schematic structural views in a second state in which the second force receiving portion in Embodiment 8 of the present invention cooperates with the second force applying component in the image forming device and a separating force is received.
Figure 35:
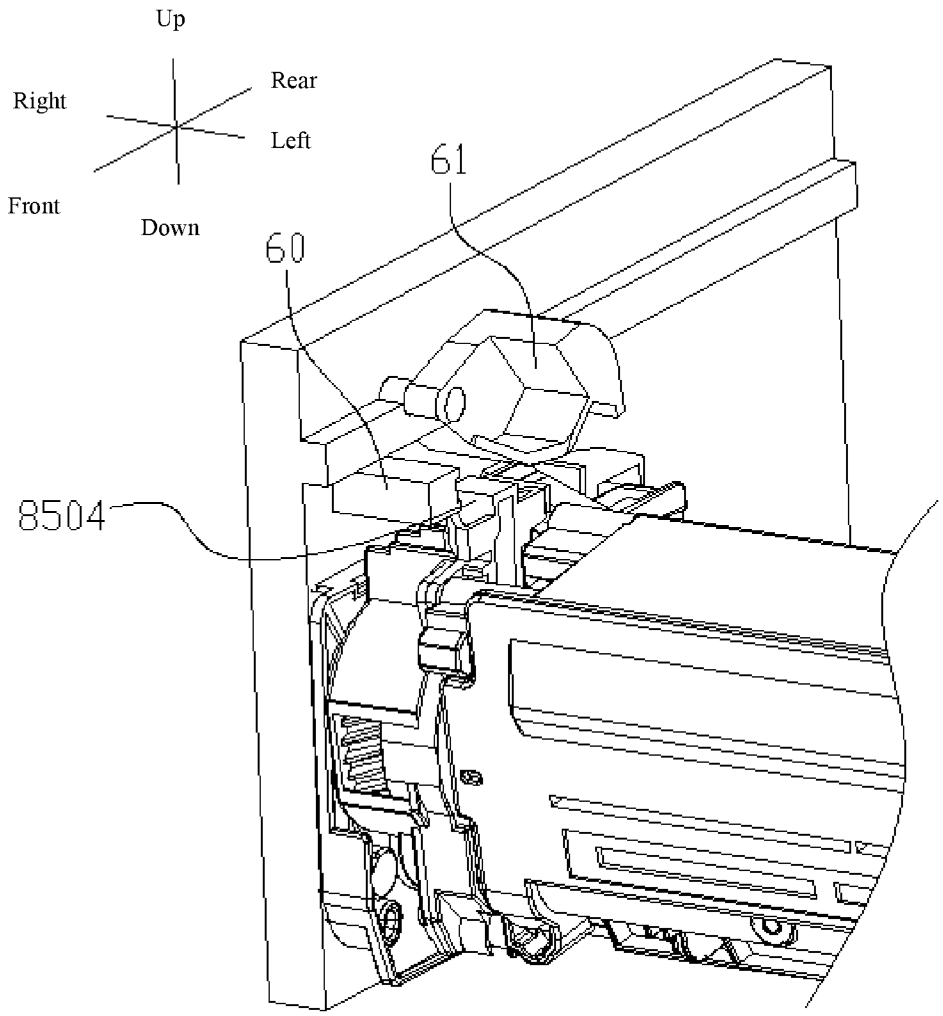
Figure 36:
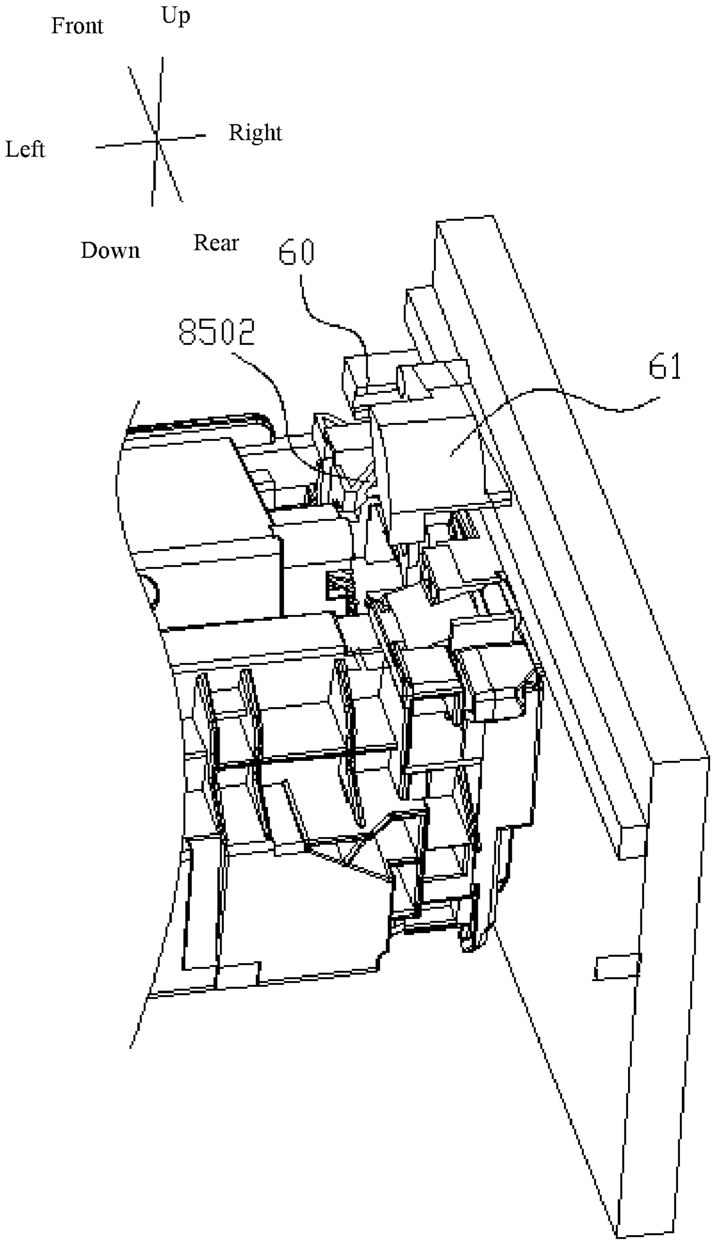
FIG. 36 is a schematic structural view when the process cartridge in Embodiment 8 of the present invention is disassembled from the image forming device.

The processes of mounting and disassembling the process cartridge and separating the drum and roller in this embodiment will be described in detail below win conjunction with FIGS. 30 to 36. First, as shown in FIGS. 30 and 31, when the door cover 12 of the image forming device is opened, the process cartridge falls into the tray 13 and is pushed into a main body of the image forming device from rear to front with the tray. For the frontmost process cartridge mounted on the tray 13, its mounting guide portion 8501 touches the first force applying component 61 and the second force applying component 60 successively so that the process cartridge moves to the left and is finally mounted to a predetermined position. The other process cartridges are mounted into the image forming device in a manner similar to the above process cartridge mounted in the frontmost. It needs to be noted here that since a transfer belt in the image forming device is provided on the lower side of the tray 13, in order to avoid the possibility of the process cartridge rubbing the transfer belt during the process of moving back and forth, when the door cover 12 is opened, the tray 13 will lift the process cartridge to an upper position. When the tray 13 is completely pushed into the main body of the image forming device, the door cover 12 is closed, and the process cartridge will descend by a certain distance with the tray 13. Then, the process cartridge is supported and positioned by a supporting and positioning component (not shown in the figure) in the image forming device. Therefore, as shown in FIGS. 32 and 33, when the door cover 12 in the image forming device is closed, the tray 13 drives the process cartridge to move downward together. At this time, the side abutting portion 8503 will also descend by a certain height. The height is set so that the second force applying component 60 will still come into contact with the side abutting portion 8503 after the process cartridge descends. At this time, there is a pressing force between the side abutting portion 8503 and the second force applying component 60. This pressing force comes from the elastic force between the conductive side of the process cartridge and the tray 13 after the process cartridge moves to the left. When the image forming device is pre-started, the second force applying component 60 moves forward by a certain distance, the process cartridge moves to the right under the elastic force, and the side abutting portion 8503 will move to a right side of a left side surface of the second force applying component 60. As shown in FIGS. 34 and 35, when the process cartridge moves to the right, the separating force receiving portion 8504 abuts against the second force applying component 60 in the front-and-rear direction. When the second force applying component 60 moves backward, the separating force receiving portion 8504 is urged, so that the developing unit moves relative to the photosensitive unit and the developing roller is separated from the photosensitive drum. When the process cartridge needs to be disassembled, as shown in FIG. 36, the abutment between the disassembly guide portion 8502 and the first force applying component 61 and the second force applying component 60 can be used to guide the process cartridge to move to the left and to allow the second force receiving portion 85 to smoothly pass over the first force applying component 61 and the second force applying component 60. As a result, the process cartridge is disassembled smoothly.

Preferably, in order to make the separating force receiving portion 8504 better receive a separating force of the second force applying component 60, the separating force receiving portion 8504 is set close to a vertical surface. Further, it can be set as an inclined hook surface that can interlock with the second force applying component 60, and the inclined hook surface extends toward a front side in a direction from bottom to top. In other words, the inclined hook surface has a recessed portion recessed backward at a position of the lower side. The recessed portion recessed backward can make good contact with the second force applying component 60, and it is not easy to loosen during the process of receiving a force to cause the developing unit to rotate. However, this brings about the following problem: when the process cartridge is mounted, this separating force receiving portion 8504 may block the mounting of the process cartridge due to the contact with the first force applying component 61 and the second force applying component 60. Therefore, in an up-and-down direction, the separating force receiving portion 8504 is provided on an upper side of the mounting guide portion 8501. In this way, when the door cover 12 is opened and the tray 13 is in an upper position, the mounting guide portion 8501 can first contact the first force applying component 61 and the second force applying component 60 so that the process cartridge can move to the left smoothly. At the same time, when the tray 13 is in a descended lower position after the door cover 12 is closed, the separating force receiving portion 8504 can again receive the separating force well.

Embodiment 9

Embodiment 9 of the present invention will be introduced below. In this embodiment, the second force receiving portion 85 cooperates with the image forming device so that the movable structure of the second force receiving portion 85 is the same as that in Embodiment 8, except that the second force receiving portion 85 is set to be movable relative to the process cartridge frame in this embodiment. Thus, the process cartridge can be mounted and disassembled smoothly without moving left and right.

Figure 37:
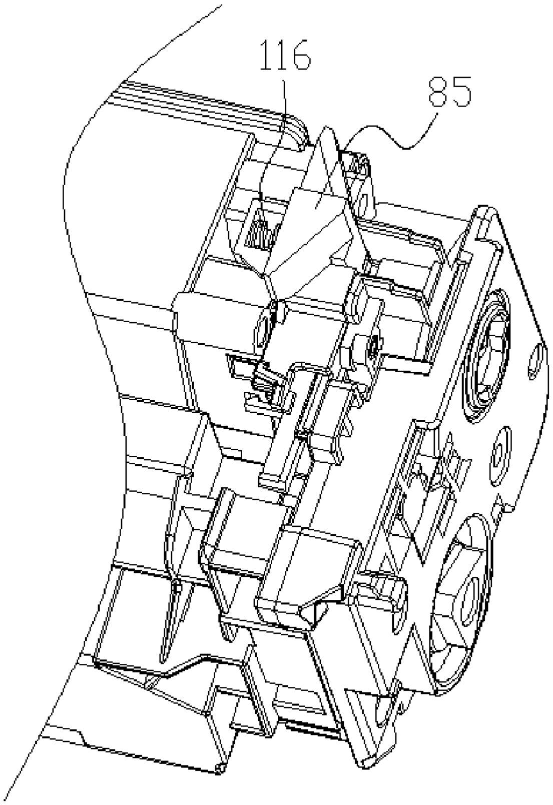
FIG. 37 is a schematic view of a partial structure of a second force receiving portion in Embodiment 9 of the present invention.
Figure 38:
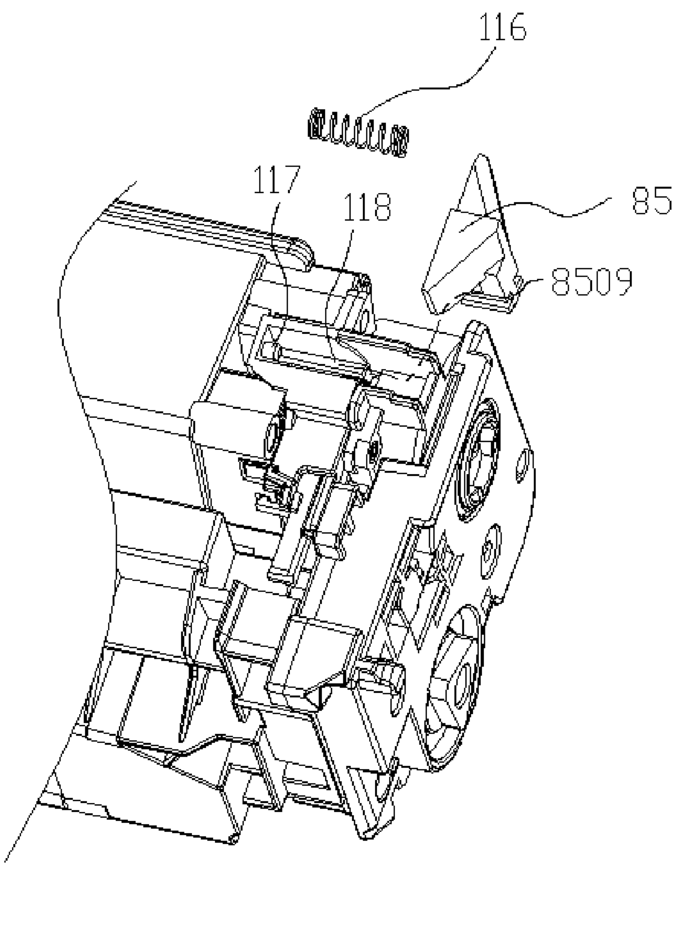
FIG. 38 is a schematic view of a partially exploded structure of the second force receiving portion in Embodiment 9 of the present invention.
Figure 39:
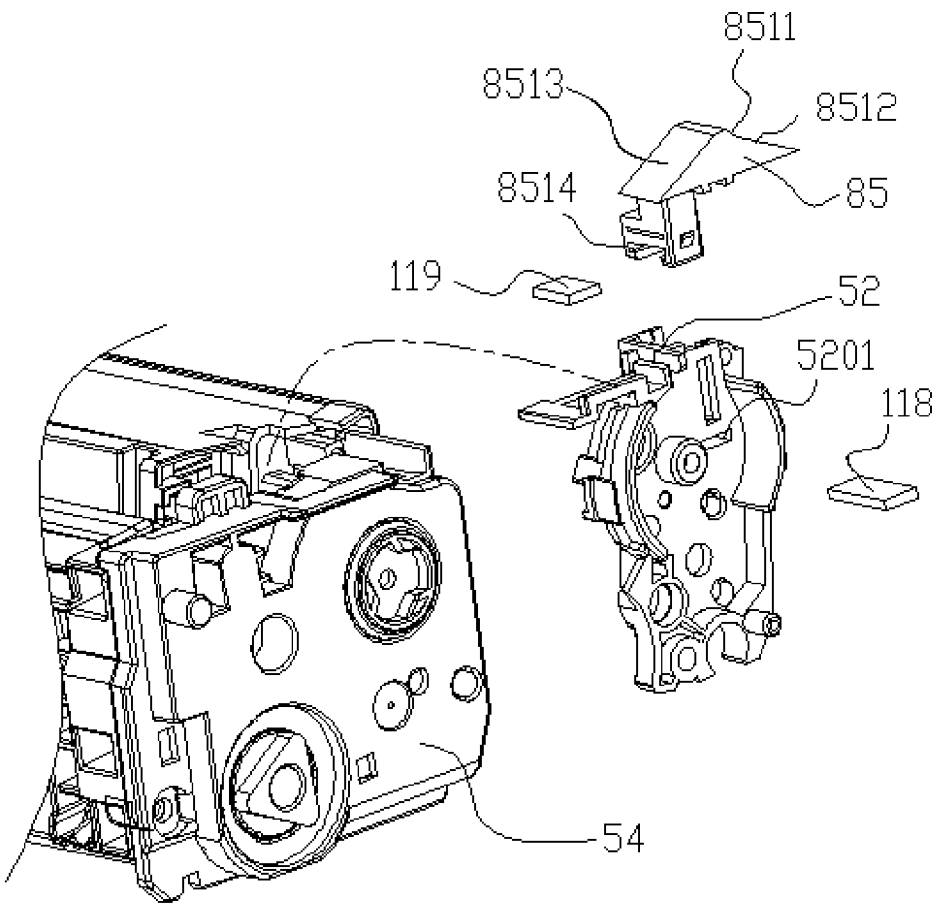
FIG. 39 is a schematic view of a partially exploded structure of a second force receiving portion in Embodiment 10 of the present invention.

As shown in FIGS. 37 and 38, a sliding guide rail 118 is formed on the process cartridge frame, and a sliding guide groove 8509 extending in the left-and-right direction is formed on the second force receiving portion 85. The sliding guide groove 8509 can slide left and right in the sliding guide rail 118. An elastic member 116 is provided between the second force receiving portion 85 and the process cartridge frame. Optionally, the urging force for the movement between the second force receiving portion 85 and the process cartridge frame may also be a magnetic urging manner.

In this embodiment, the process of mounting and disassembling the process cartridge and the process of separating the photosensitive drum and the developing roller are similar to those in Embodiment 8, except that the process cartridge can move left and right as a whole in Embodiment 8, and the second force receiving portion 85 can move left and right alone in this embodiment. The process of mounting and disassembling the process cartridge and the process of separating the photosensitive drum and the developing roller are not described again here.

Embodiment 10

Figure 40:
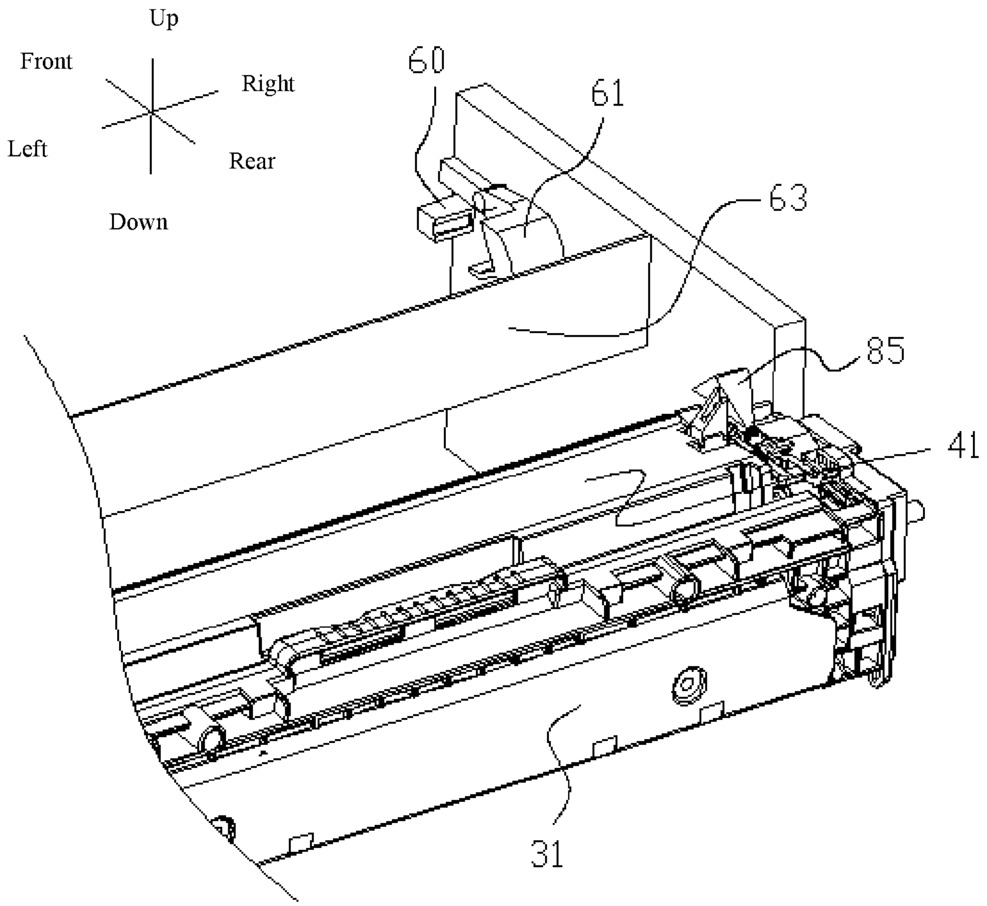
FIG. 40 is a schematic structural view when a process cartridge in Embodiment 11 of the present invention is mounted to the image forming device.

Embodiment 10 of the present invention will be introduced below. As shown in FIG. 40, in this embodiment, the second force receiving portion 85 is set into a structure movable up and down by means of magnetic urging.

The second force receiving portion 85 is provided with a separating force receiving portion 8511, a mounting guide portion 8512, and a disassembly guide portion 8513 thereon. The inclination angle is different between the mounting guide portion 8512 and the disassembly guide portion 8513. A first magnetic member mounting portion 8514 is further provided on the second force receiving portion 85, and a first magnetic member 1181 is mounted into the above first magnetic member mounting portion 8514. A second magnetic member mounting portion 5201 is provided on the supporting support 52. A second magnetic member 1191 is mounted into the above second magnetic member mounting portion 5201. The first magnetic member 1181 and the second magnetic member 1191 are disposed oppositely and the magnetism of the opposite surfaces is opposite. The second force receiving portion 85 is mounted into the supporting support 52 and can move up and down. When being mounted and disassembled, the process cartridge passes over the first force applying component 61 and the second force applying component 60 in the image forming device by using the mounting guide portion 8512 and the disassembly guide portion 8513 having an inclination angle. The separating force receiving portion 8511 is disposed to have an inclination angle with respect to the vertical direction. In order to increase the separating force of the separating force receiving portion 8511 to receive the second force applying component 60, and at the same time, in order to allow the process cartridge to be better mounted and disassembled, the separating force receiving portion 8511 is disposed to be closer to the vertical surface relative to the mounting guide portion 8512, that is, the separating force receiving portion 8511 is steeper than the mounting guide portion 8512. Preferably, in order to further facilitate the separating force receiving portion 8511 to receive the separating force of the second force applying component 60, a surface of the second force receiving portion 85 may be covered with a material with a larger surface friction coefficient, or the second force receiving portion 85 may be directly made of a material with a relatively large friction coefficient such as rubber.

Embodiment 11

Embodiment 11 of the present invention will be described below. In this embodiment, the second force receiving portion 85 is set as a structure that is movable in both the up-and-down direction and the left-and-right direction.

As shown in FIGS. 40 to 44, in order to better protect the first force applying component 61 and the second force applying component 60 in the image forming device, a baffle member 63 is added to a part of the image forming device. The baffle member 63 is provided at a front end of the first force applying component 61 and the second force applying component 60. When the process cartridge is mounted into the image forming device with the tray, the second force receiving portion 85 provided at the upper end of the developing unit frame may be blocked by the baffle member 63. Therefore, it is necessary to set the second force receiving portion 85 to be movable in the up-and-down direction to avoid being blocked by the interference of the baffle member 63. When the second force receiving portion 85 passes over the baffle member 63, it can abut against the first force applying component 61 and the second force applying component 60 and move leftward.

Figure 41:
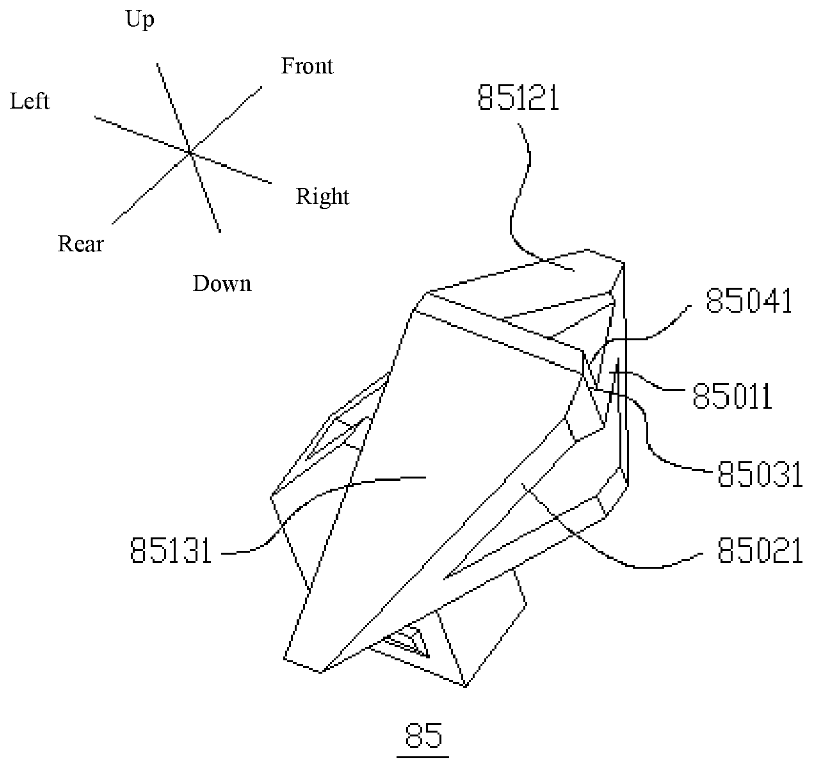
FIG. 41 is a schematic view of an enlarged structure of a second force receiving portion in Embodiment 11 of the present invention.

Specifically, as shown in FIG. 41, the second force receiving portion 85 is provided with a first mounting guide portion 85121, a second mounting guide portion 85011, a first disassembly guide portion 85131, a second disassembly guide portion 85021, a separating force receiving portion 85041 and a side abutting portion 85031 thereon. The first mounting guide portion 85121 and the first disassembly guide portion 85131 can abut against the baffle member 63 to guide the movement of the second force receiving portion 85 in the up-and-down direction, and the second mounting guide portion 85011 and the second disassembly guide portion 85021 may abut against the first force applying component 61 and the second force applying component 60 to guide the movement of the second force receiving portion 85 in the left-and-right direction. The side abutting portion 85031 is used for temporary abutment with the second force applying component 60, and the separating force receiving portion 85041 is used for receiving the separating force for separating the developing roller and the photosensitive drum that is output by the second force applying component 60. The first mounting guide portion 85121 and the second mounting guide portion 85011 are provided at a front end of the side abutting portion 85031, and the first disassembly guide portion 85131 and the second disassembly guide portion 85021 are provided at a rear end of the side abutting portion 85031. The separating force receiving portion 85041 is provided on a right side of at least a part of the first mounting guide portion 85121 and an upper side of at least a part of the second mounting guide portion 85011. Preferably, a recessed portion recessed downward from the first mounting guide portion 85121 while recessed leftward from the second mounting guide portion 85011 is formed in the vicinity of the separating force receiving portion 85041, and the separating force receiving portion 85041 is provided on this recessed portion. The shape of the separating force receiving portion 85041 is configured to be similar to that in Embodiment 8, and may be specifically configured as an approximately vertical surface or an inclined hook surface. The first mounting guide portion 85121 and the first disassembly guide portion 85131 are configured as similar structures to those in Embodiment 10. The second mounting guide portion 85011 and the second disassembly guide portion 85021 are configured as similar structures to those in Embodiment 8.

Figure 42:
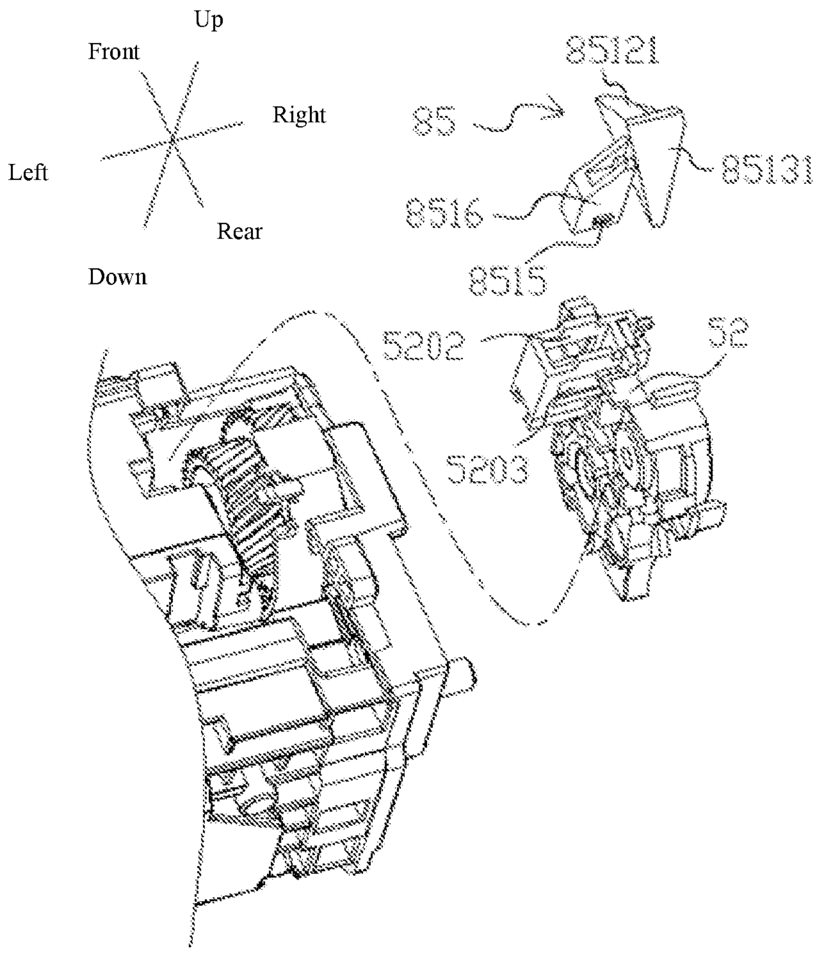
FIGS. 42 to 44 are schematic views of an exploded structure of the second force receiving portion in Embodiment 11 of the present invention being mounted to the process cartridge.
Figure 43:
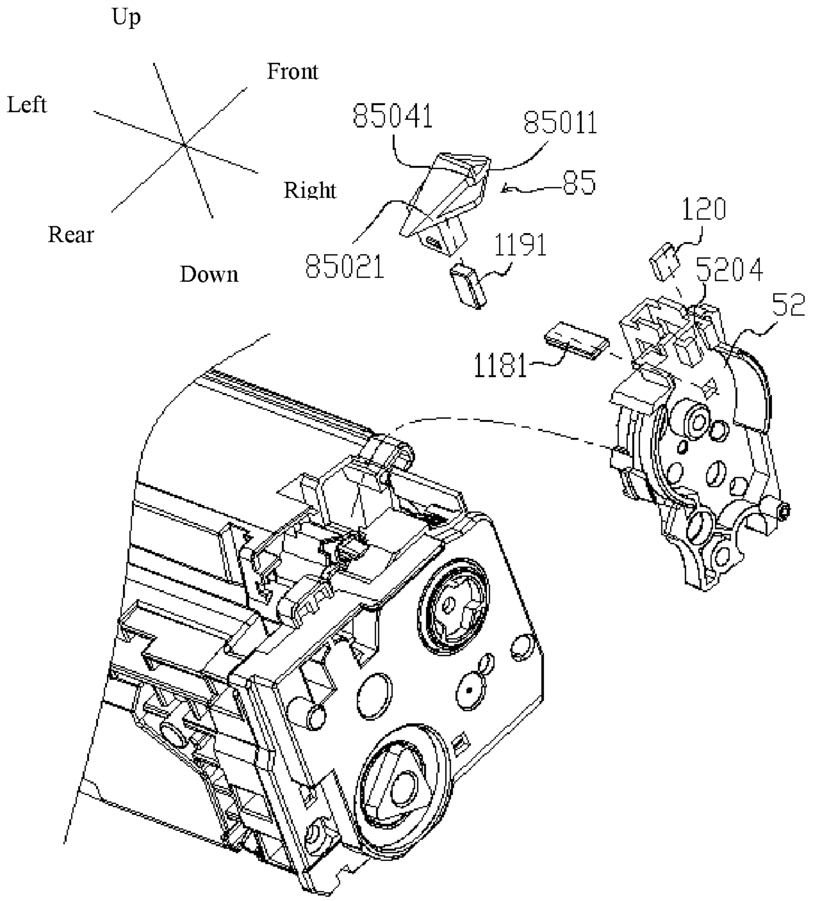
Figure 44:
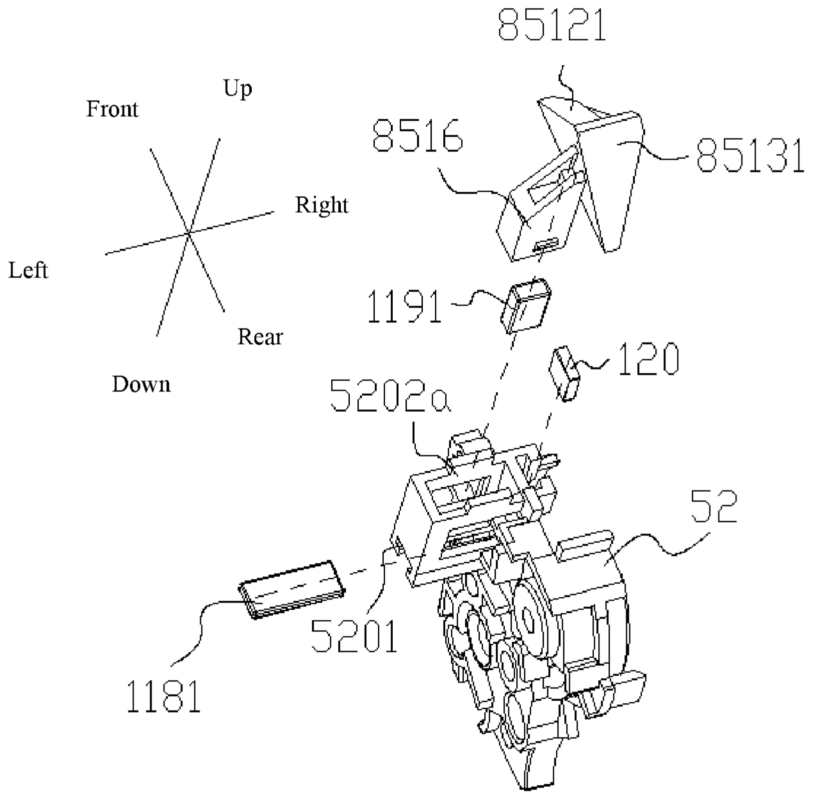

As shown in FIGS. 42 to 44, an accommodating cavity 5202 and a stop hole 5203 are formed on the supporting support 52. A buckle 8515 and an extension column 8516 are formed on the second force receiving portion 85, wherein the buckle 8515 can be inserted into the stop hole 5203, and the extension column 8516 can be mounted in the accommodating cavity 5202 and can slide in the accommodating cavity 5202. An inner side wall 5202*a* of the accommodating cavity 5202 is in contact with a side wall of the extension column 8516 for restricting the movement of the second force receiving portion 85 relative to the developing unit in the front-and-rear direction. A first magnet mounting portion 5201 and a second magnet mounting portion 5204 are further provided on the supporting support 52. The first magnetic member 1181 is mounted into the first magnet mounting portion 5201, and preferably, it extends in the left-and-right direction. The third magnetic member 120 is mounted in the second magnet mounting portion 5204, and preferably, it extends in the up-and-down direction. The first magnetic member 1181 and the third magnetic member 120 are disposed at an angle. Preferably, the first magnetic member 1181 and the third magnetic member 120 are disposed at 90 degrees. The second magnetic member 1191 is mounted into the second force receiving portion 85, and preferably, it extends in the up-and-down direction. The first magnetic member 1181 and the second magnetic member 1191 are configured to magnetically repel each other. The second magnetic member 1191 and the third magnetic member 120 are configured to magnetically attract each other. The second force receiving portion 85 is configured to be floatingly supported in the accommodating cavity 5202, can move left and right and move up and down flexibly, and can realize combined movement in the left-and-right direction and the up-and-down direction. For example, it can move diagonally downward to the left, diagonally downward to the right or the like. The abutting process between the side abutting portion 85031 and the second force applying component 60 is similar to those in Embodiment 8 and Embodiment 9. It is also used to temporarily abut against the left side of the second force applying component 60 after the door cover in the image forming device is closed. When being pre-operated in the image forming device, the second force applying component 60 moves forward, the second force receiving portion 85 further moves to the right, and the separating force receiving portion 85041 starts to have an overlapping area with the second force applying component 60 in the front-and-rear direction and receives the separating force.

Embodiment 12

Figure 45:
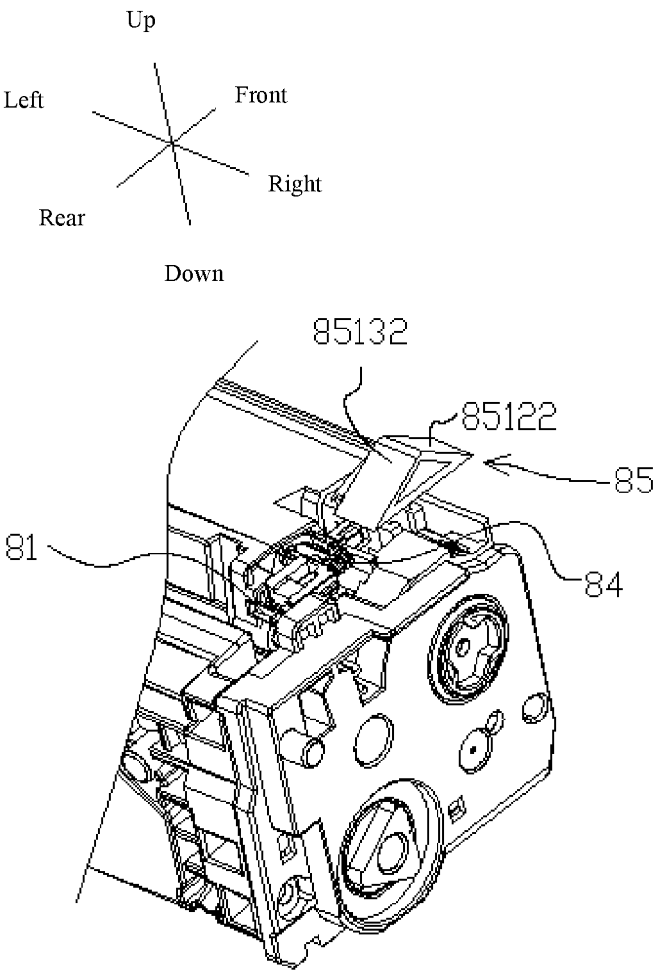
FIG. 45 is a schematic view of a partial structure of a force receiving component in Embodiment 12 of the present invention.
Figure 46:
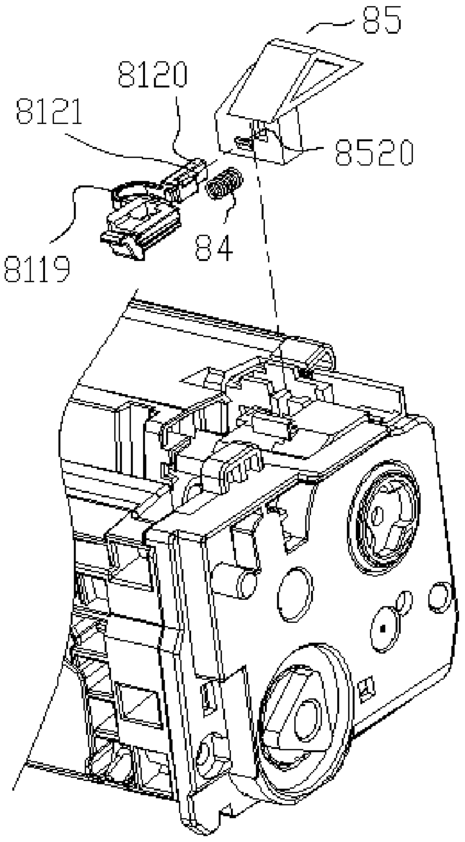
FIG. 46 is a schematic view of a partially exploded structure of the force receiving component in Embodiment 12 of the present invention.

Embodiment 12 of the present invention will be introduced below. This embodiment is different from Embodiment 10 in that in this embodiment, the separating force receiving portion and the mounting guide portion are made as an integral surface. Specifically, as shown in FIGS. 45 and 46, the second force receiving portion 85 is provided with a mounting guide portion 85122 and a disassembly guide portion 85132. The mounting guide portion 85122 and the disassembly guide portion 85132 are set as the same as those in Embodiment 10. The second force receiving portion 85 is set to be movable up and down, and the mounting guide portion 85122 and the disassembly guide portion 85132 are used to guide the movement of the second force receiving portion 85 so that the process cartridge can be normally mounted. In this embodiment, a first force receiving portion 81 is provided on the process cartridge, and can receive the force of the first force applying component 61 to move. When the process cartridge is mounted into the image forming device with the tray 13, since the door cover 12 of the image forming device has not been closed yet, a return elastic member 84 is provided between the first force receiving portion 81 and the process cartridge frame. Preferably, the return elastic member 84 is configured as a spring provided between the process cartridge frame and the first force receiving portion 81. The first force receiving portion 81 is in a backward position under the action of the elastic force of the return elastic member 84 without contacting the second force receiving portion 85. The second force receiving portion 85 can move up and down freely to complete the mounting of the process cartridge. When the tray 13 is mounted in place, the door cover 12 of the image forming device is closed, and the first force applying component 61 rotates downward as the door cover 12 is closed, and pushes the first force receiving portion 81 to move forward. A positioning portion 8120 is provided on the first force receiving portion 81, and a positioned portion 8520 that can cooperate with the positioning portion 8120 is provided on the second force receiving portion 85. Preferably, the positioned portion 8520 is configured as a groove or hole extending in the front-and-rear direction, and the positioning portion 8120 is configured as a protruding portion that can be inserted into the above groove or hole. Preferably, an elastic part 8119 is further provided on the first force receiving portion 81, and the elastic part 8119 is used for pre-contacting the positioning portion 8120 with the second force receiving portion 85 but not engaging in the positioned portion 8520. When the door cover of the image forming device is closed, the image forming device has not driven the second force applying component 60 to move forward. At this time, the upward movement of the second force receiving portion 85 will be blocked by the second force applying component 60. After receiving the force of the first force applying component 61, the first force receiving portion 81 overcomes the elastic force of the return elastic member 84 and moves forward to approach the second force receiving portion 85, but the positioned portion 8520 on the second force receiving portion 85 is still not moved up to a position that can cooperate with the positioning portion 8120. At this time, the elastic force of the elastic part 8119 is used to make the positioning portion 8120 contact the second force receiving portion 85. When the image forming device is pre-operated and the second force applying component 60 is caused to move forward, the second force receiving portion 85 is no longer blocked by the second force applying component 60 and can continue to move upward. When the positioned portion 8520 on the second force receiving portion 85 moves to a position that can be normally matched with the positioning portion 8120, the positioning portion 8120 is inserted into the positioned portion 8520. At this time, the second force receiving portion 85 is positioned and cannot move up and down. For the convenience of description, a position where the second force receiving portion 85 can receive the force of the second force applying component for separating the developing roller and the photosensitive drum is referred to as a separating force receiving position. In this embodiment, when the positioning portion 8120 cooperates with the positioned portion 8520, the second force receiving portion 85 is at the separating force receiving position. When the second force applying component 60 moves back from front to rear, it will contact the mounting guide portion 85122. However, because the second force receiving portion 85 is positioned and cannot move up and down, with the abutment of the the mounting guide portion 85122 and the second force applying component 60, the second force receiving portion 85 can drive the developing unit to move so that the developing roller is separated from the photosensitive drum. When the process cartridge is disassembled, the door cover 12 in the image forming device is opened, the first force applying component 61 rotates upward with the opening of the door cover, and the first force applying component 61 cancels the pressing on the first force receiving portion 81. The first force receiving portion 81 moves backward under the elastic force of the return elastic member 84 so that the positioning portion 8120 is withdrawn from the positioned portion 8520. The second force receiving portion 85 is restored to a state where it can move up and down freely. As a result, the process cartridge can be taken out smoothly with the tray. In this embodiment, the force of the second force receiving portion 85 to move up and down can be realized by using an elastic member such as a spring, or by using a magnetic urging member such as a magnet. Similarly, the return elastic member 84 may also be selected to adopt the form of magnetic urging as long as the urging movement of the second force receiving portion 85 and the first force receiving portion 81 can be realized. Optionally, the movement manner of the second force receiving portion 85 may not be limited to a manner of up and down movement, or may also be a manner of left and right movement, or the second force receiving portion 85 may rotate back and forth about a fulcrum, which can all make the second force receiving portion 85 be positioned at the separating force receiving position with the cooperation between the positioning portion and the positioned portion in this embodiment.

Embodiment 13

Figure 47:
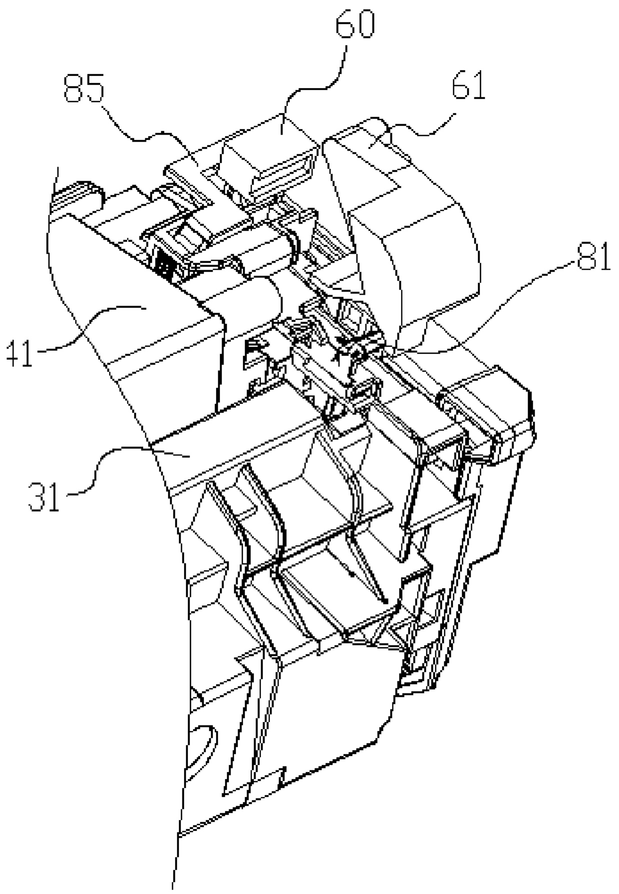
FIG. 47 is a schematic view of a partial structure of a force applying component in Embodiment 13 of the present invention.

Embodiment 13 of the present invention will be introduced below. In this embodiment, as shown in FIG. 47, a state wherein the process cartridge is not mounted in the imaging device is set to a state of separation between the developing roller and the photosensitive drum, and an elastic member such as a spring can be used to urge the developing unit and the photosensitive unit so that the developing roller and the photosensitive drum are spaced apart. When the process cartridge is mounted into the image forming device with the tray and reaches a predetermined mounting position, the force receiving part of the second force receiving portion 85 is provided on the front side of the second force applying component. At this time, the developing roller and the photosensitive drum are in a separation state. When the image forming device is operated, the second force applying component 60 starts to move forward and then moves backward to return to an initial position where the drum and the roller are separated. When the image forming device needs to perform an imaging action, it is necessary to make the developing roller contact the photosensitive drum. At this time, the second force applying component 60 will move forward by a certain distance, and during the forward movement of the second force applying component 60, the second force receiving portion 85 will be urged to drive the developing unit 41 to rotate relative to the photosensitive unit 31, and the developing roller is caused to completely contact the photosensitive drum. In order to maintain the contact pressure between the developing roller and the photosensitive drum to be elastic, an elastic member may be added between the second force receiving portion 85 and the frame of the developing unit 41.

Embodiment 14

Figure 48:
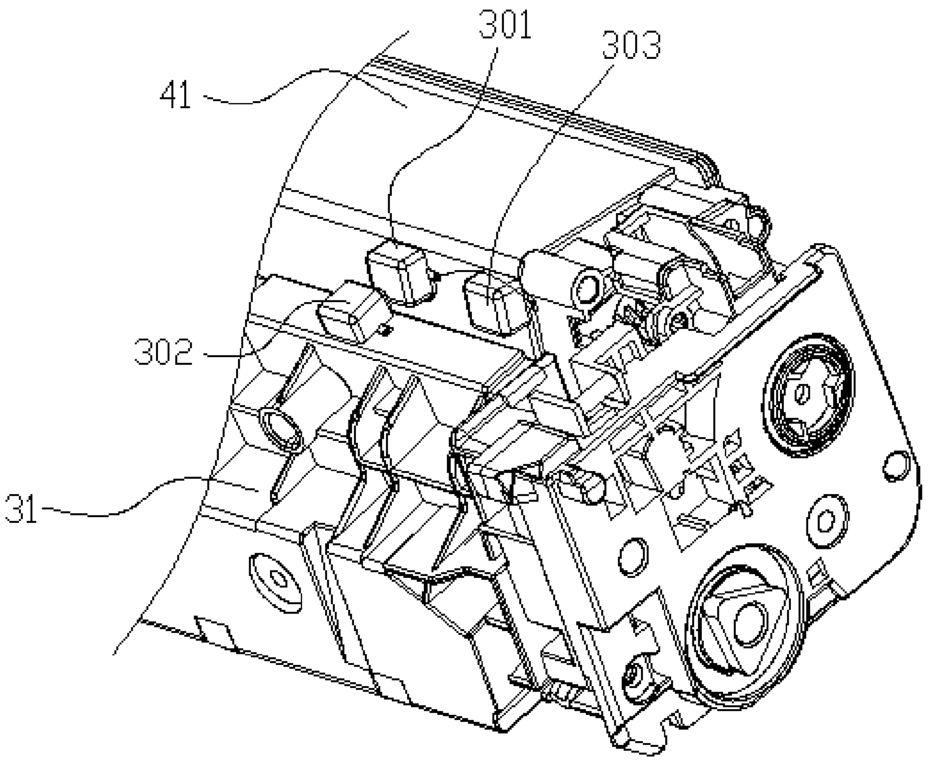
FIG. 48 is a schematic view of a partial structure of a force applying component in Embodiment 14 of the present invention.

Embodiment 14 of the present invention will be introduced below. In this embodiment, as shown in FIG. 48, an electromagnet 301 is provided on the developing unit 41, a permanent magnet 302 is provided on the photosensitive unit 31, and an electromagnet controller 303 is further provided on the developing unit 41. The electromagnet controller 303 receives the power in the image forming device. Since the power of the image forming device changes during the image forming state and the non-image forming state, such as the change between positive and negative polarity of the power, etc., with this feature, the attraction and repulsion between the electromagnet 301 and the permanent magnet 302 can be controlled by the electromagnet controller 303 electrically connected to the image forming device to achieve the effect of separating the drum and the roller.

Embodiment 15

Figure 49:
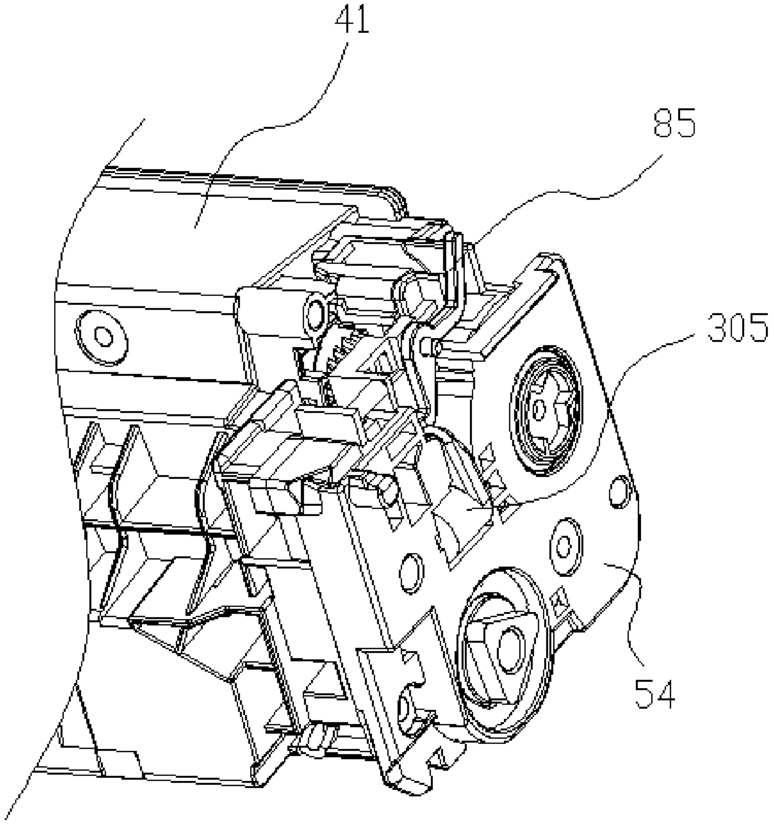
FIG. 49 is a schematic view of a partial structure of a force applying component in Embodiment 15 of the present invention.
Figure 50:
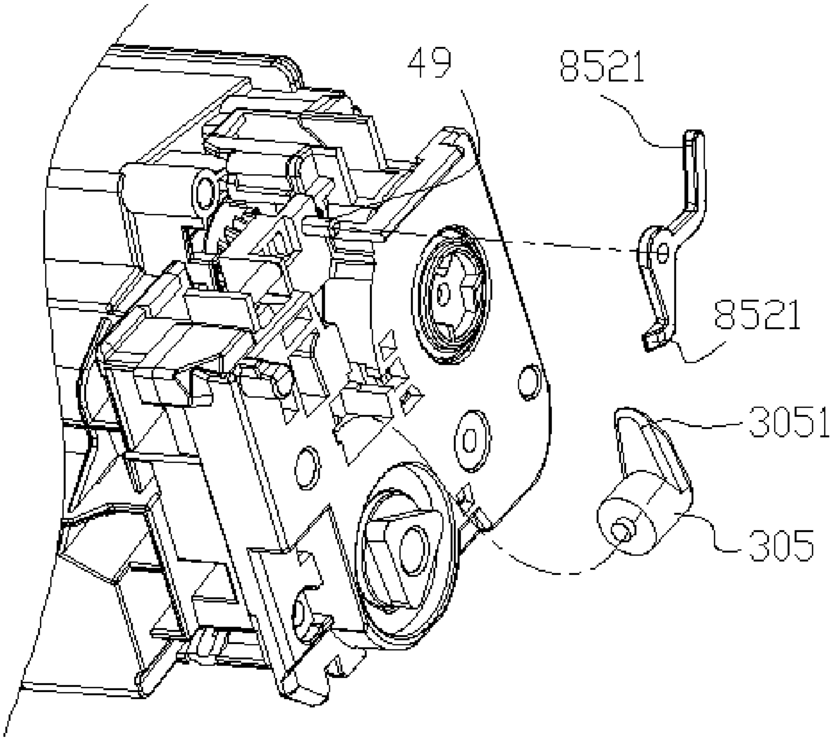
FIG. 50 is a schematic view of a partially exploded structure of a force applying component in Embodiment 16 of the present invention.

Embodiment 15 of the present invention will be introduced below. As shown in FIGS. 49 and 50, in this embodiment, a friction member 305 is provided on the process cartridge, a cam 3051 is provided on the friction member 305, and a cam abutment portion 8521 that can be matched with the cam 3051 is provided on the second force receiving portion 85. The second force receiving portion 85 is set to be rotatable about a rotation fulcrum 49 on the process cartridge. The friction member 305 is also configured to rotate about a rotation fulcrum (not shown in the figure) in the image forming device. By using the action that the process cartridge moves downward when the door cover 12 in the image forming device is closed, the friction member 305 is set to abut against the inner wall of the image forming device, and the friction member 305 is rotated by using friction resistance. When the friction member 305 rotates, the cam 3051 urges the cam abutment portion 8521 to make the second force receiving portion 85 rotate upward. As the image forming device operates, the second force receiving portion 85 can receive a separating force of the second force applying component 60 to separate the developing roller and the photosensitive drum.

Optionally, in the above embodiments, as an action mechanism for urging the movement of the second force receiving portion 85, the action mechanism may adopt the magnetic member in this embodiment and use the magnetic member to provide an urging force, or may adopt an elastic member such as a spring and a torsion spring in the above embodiments to provide an urging force. The urging force is used to realize the movement of the second force receiving portion. The form in which the action mechanism acts on the movement of the second force receiving portion is not limited to the urging force, and other structures such as tension springs, elastic rubber bands or magnetic attraction may also be selected. The tension or suction is used to act on the movement of the second force receiving portion 85. In short, any action mechanism that can act on the movement of the second force receiving portion 85 is applicable to the present invention.

In the above embodiments, a distance between the force receiving part of the second force receiving portion 85 and the side cover 54 is defined as a distance between the force receiving part of the second force receiving portion 85 and the rightmost surface of the side cover 54. Although in Embodiments 1 to 4 above, it is specifically defined that the moving direction or the rotation and swing direction of the second force receiving portion 85 is in the longitudinal direction of the process cartridge, it is obvious that the moving direction of the second force receiving portion 85 may not be reversed in accordance with the longitudinal direction of the process cartridge, or may be at an angle with the longitudinal direction, or may be in a curved manner. To sum up the above structure, the second force receiving portion 85 will be in two positions. At a first position, the distance between the second force receiving portion 85 and the outermost surface of the side cover 54 in the longitudinal direction of the process cartridge is a first distance, wherein the side cover 54 is provided on the same side as the second force receiving portion 85 on the process cartridge. At the second position, the distance between the second force receiving portion 85 and the outermost surface of the side cover 54 in the longitudinal direction of the process cartridge is a second distance, wherein the side cover 54 is provided on the same side as the second force receiving portion 85 on the process cartridge. The first distance is greater than the second distance. Moreover, when at the second position, in the longitudinal direction of the process cartridge, the force receiving part of the second force receiving portion 85 may interfere with the second force applying component 60.

The above embodiments are only used to illustrate the technical solutions of the present invention, and are not intended to limit them. Although the present invention has been described in detail with reference to the foregoing embodiments, it should be understood by those of ordinary skill in the art that it is still possible to made modifications of the technical solutions described in the foregoing embodiments or equivalent replacements of some technical features therein. However, these modifications or replacements do not cause the essence of corresponding technical solutions to deviate from the spirit and scope of the technical solutions of the embodiments of the present invention.

What is claimed is:

1. A process cartridge, which is detachably mounted in an image forming device, wherein the image forming device has force applying components and a movable tray, the tray can move in a front-and-rear direction, a direction in which the tray is pushed into the image forming device is front, and a direction in which the tray is pulled out from the image forming device is rear; and the process cartridge can be mounted into the tray from top to bottom along a direction of gravity, the process cartridge comprising:

a photosensitive unit comprising a photosensitive drum and a support configured to support the photosensitive drum;

a developing unit, which is rotatable relative to the photosensitive unit, and comprises a developing roller and a developing frame configured to support the developing roller, wherein the process cartridge has a driving side and a conductive side disposed oppositely along a left-and-right direction, and the driving side is provided with a first driving force receiving portion for driving the photosensitive drum to rotate and a second driving force receiving portion for driving the developing roller to rotate; and a force receiving portion, wherein the force receiving portion has a separating force receiving portion for receiving the force of one of the force applying components so that the developing unit rotates relative to the photosensitive unit to separate the developing roller from the photosensitive drum; and wherein the developing frame comprises a sliding guide rail extending in the left-and-right direction, the force receiving portion is configured to slide in the sliding guide rail.

2. The process cartridge according to claim 1, wherein the force receiving portion has a mounting guide portion and a disassembly guide portion, and both the mounting guide portion and the disassembly guide portion can cooperate with the force applying components so that the force receiving portion moves at least in a longitudinal direction and/or gravity direction of the process cartridge.

3. The process cartridge according to claim 2, wherein the mounting guide portion is configured as a mounting guide inclined surface, the disassembly guide portion is configured as a disassembly guide inclined surface, and the mounting guide inclined surface and the disassembly guide inclined surface have different extending directions.

4. The process cartridge according to claim 2, wherein the mounting guide portion and the disassembly guide portion are in contact with one of the force applying components and are urged by that one of the force applying components, and the force receiving portion moves in a direction close to a left side of the process cartridge and/or a lower side of the process cartridge.

5. The process cartridge according to claim 1, wherein the force receiving portion is mounted on the process cartridge and is movable relative to the support.

6. The process cartridge according to claim 1, wherein the force receiving portion is provided with a side abutting portion, and when the force receiving portion moves from left to right in the image forming device, the side abutting portion is configured to cooperate with the force applying components to temporarily restrict the force receiving portion from moving to a right side.

7. The process cartridge according to claim 6, wherein a separating force receiving portion that receives a separating force of the force applying components to separate the photosensitive drum and the developing roller is provided on the force receiving portion, and the separating force receiving portion is provided adjacent to the side abutting portion and is provided on a left side of the side abutting portion.

8. The process cartridge according to claim 2, wherein a separating force receiving portion that receives a separating force of the force applying components to separate the photosensitive drum and the developing roller is provided on the force receiving portion, and the separating force receiving portion is provided on an upper side of at least a part of the mounting guide portion.

9. The process cartridge according to claim 8, wherein the separating force receiving portion is provided on a front side of the disassembly guide portion.

10. The process cartridge according to claim 1, wherein an elastic member is provided between the force receiving portion and the process cartridge.

11. The process cartridge according to claim 1, wherein a magnetic member is provided between the force receiving portion and the process cartridge.

12. The process cartridge according to claim 1, wherein the force receiving portion comprises a slider slidably fit inside the sliding guide rail.

13. The process cartridge according to claim 1, wherein the force receiving portion extends beyond the support and the developing frame.

14. The process cartridge according to claim 1, wherein the force receiving portion is configured to receive an external force and, through the sliding guide rail to cause the developing frame to rotate relative to the support, thereby separating the developing roller and the photosensitive drum.

15. The process cartridge according to claim 14, wherein the sliding guide rail extends in a direction different from a direction of movement of the force receiving portion caused by the external force.

16. The process cartridge according to claim 12, wherein the force receiving portion comprises a force receiving surface configured to contact and receive the force from one of the force applying components; wherein the force receiving surface is parallel to the left-and-right direction.

17. The process cartridge according to claim 1, wherein during a process of the process cartridge being pushed into the image forming device with the tray, the force receiving portion can receive the force of one of the force applying components and move relative to the support at least in the left-and-right direction and/or an up-and-down direction.

* * * * *